(12) United States Patent
Thyni et al.

(10) Patent No.: US 12,284,529 B2
(45) Date of Patent: Apr. 22, 2025

(54) METHODS OF OBTAINING RADIO ACCESS NODE INSTALLATION DATA AND RELATED USER EQUIPMENT DEVICES, RADIO NODES, AND MANAGEMENT NODES

(71) Applicant: TELEFONAKTIEBOLAGET LM ERICSSON (PUBL), Stockholm (SE)

(72) Inventors: Tomas Thyni, Järfälla (SE); Mats Forsman, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 17/779,926

(22) PCT Filed: Dec. 23, 2019

(86) PCT No.: PCT/IB2019/061269
§ 371 (c)(1),
(2) Date: May 25, 2022

(87) PCT Pub. No.: WO2021/130516
PCT Pub. Date: Jul. 1, 2021

(65) Prior Publication Data
US 2023/0009373 A1    Jan. 12, 2023

(51) Int. Cl.
*H04W 16/18*  (2009.01)
*H01Q 1/24*  (2006.01)
*H04M 1/724*  (2021.01)

(52) U.S. Cl.
CPC ............ *H04W 16/18* (2013.01); *H01Q 1/246* (2013.01); *H04M 1/724* (2021.01)

(58) Field of Classification Search
CPC ...... H04W 16/18; H04W 16/28; H04W 24/00; H04W 4/80; H04W 24/02; H01Q 1/246; H04M 1/724
See application file for complete search history.

(56) References Cited

U.S. PATENT DOCUMENTS

| 6,963,552 B2 | 11/2005 | Sabat, Jr. et al. |
| 7,761,093 B2 | 7/2010 | Sabat, Jr. et al. |

(Continued)

FOREIGN PATENT DOCUMENTS

| EP | 2334113 A1 | 6/2011 |
| JP | 2019125253 A | 7/2019 |

(Continued)

OTHER PUBLICATIONS

Checko A. et al., "Cloud RAN for Mobile Networks—A Technology Overview," in IEEE Communications Surveys & Tutorials, doi: 10.1109/COMST.2014.2355255, vol. 17, No. 1, pp. 405-426, First quarter 2015.

(Continued)

*Primary Examiner* — Lester G Kincaid
*Assistant Examiner* — Abdullah Al Mamun

(57) ABSTRACT

A method of operating a User Equipment (UE) device may be provided. Installation data relating to an antenna of a radio access network (RAN) node may be obtained, wherein the installation data includes physical installation data including at least one of a height of the antenna, a direction of the antenna, and/or a tilt of the antenna. The installation data may be transmitted from the UE device to a management system for a wireless communication network including the RAN node. Related radio nodes and management nodes are also discussed.

21 Claims, 22 Drawing Sheets

(56) References Cited

U.S. PATENT DOCUMENTS

| | | | |
|---|---|---|---|
| 7,920,858 | B2 | 4/2011 | Sabat, Jr. et al. |
| 8,160,570 | B2 | 4/2012 | Sabat, Jr. et al. |
| 8,406,126 | B1 | 3/2013 | Leiba et al. |
| 8,559,939 | B2 | 10/2013 | Sabat, Jr. et al. |
| 9,867,052 | B2 | 1/2018 | Sabat, Jr. et al. |
| 10,027,508 | B2 | 7/2018 | Leiba et al. |
| 10,419,092 | B2 | 9/2019 | Srinivasan |
| 2001/0036163 | A1 | 11/2001 | Sabat, Jr. et al. |
| 2005/0243785 | A1 | 11/2005 | Sabat et al. |
| 2007/0229378 | A1* | 10/2007 | Clark .................. H01Q 1/125 343/765 |
| 2009/0061941 | A1* | 3/2009 | Clark .................. H01Q 1/246 455/562.1 |
| 2010/0255855 | A1 | 10/2010 | Sabat, Jr. et al. |
| 2011/0143649 | A1 | 6/2011 | Sabat, Jr. et al. |
| 2013/0012195 | A1 | 1/2013 | Sabat, Jr. et al. |
| 2013/0231152 | A1 | 9/2013 | Zimmerman |
| 2013/0286869 | A1 | 10/2013 | Woelker et al. |
| 2013/0294240 | A1 | 11/2013 | Suni |
| 2014/0036780 | A1 | 2/2014 | Sabat, Jr. et al. |
| 2015/0355786 | A1* | 12/2015 | Sabatelli .............. G06F 3/017 715/798 |
| 2016/0277209 | A1 | 9/2016 | Leiba et al. |
| 2017/0019718 | A1* | 1/2017 | Akgunduz ......... H04N 21/4345 |
| 2017/0177430 | A1 | 6/2017 | Kazmi et al. |
| 2018/0317150 | A1 | 11/2018 | Lubenski et al. |
| 2019/0150003 | A1* | 5/2019 | He .................. H04B 7/0617 342/368 |
| 2019/0302273 | A1 | 10/2019 | Sano et al. |
| 2020/0007414 | A1 | 1/2020 | Smith et al. |
| 2020/0084202 | A1 | 3/2020 | Smith et al. |
| 2020/0012056 | A1 | 4/2020 | Lubenski et al. |
| 2020/0120568 | A1 | 4/2020 | Lubenski et al. |
| 2020/0126265 | A1* | 4/2020 | Gade .................. G06F 1/163 |
| 2020/0187015 | A1* | 6/2020 | Li .................. H04W 16/18 |
| 2020/0228988 | A1* | 7/2020 | Yang .................. H04L 63/1466 |
| 2020/0039615 | A1 | 12/2020 | Fiaschi et al. |
| 2020/0396154 | A1 | 12/2020 | Fiaschi et al. |
| 2021/0219190 | A1 | 7/2021 | Cao |
| 2021/0329416 | A1* | 10/2021 | Li .................. H04W 64/00 |
| 2023/0362661 | A1 | 11/2023 | Thyni et al. |

FOREIGN PATENT DOCUMENTS

| | | |
|---|---|---|
| JP | 2019178983 A | 10/2019 |
| KR | 20150073279 A | 7/2015 |

OTHER PUBLICATIONS

Novaes, "Virtualized C-RAN Orchestration with Docket Kubernetes and OpenAirInterface", arxiv.org, Cornell University Library, 201 Olin Library Cornell University Ithaca, NY 14853, Jan. 13, 2020 (Jan. 13, 2020).

3GGP, The Mobile Broadband Standard, 2019, accessed at www.3gpp.org on Nov. 15, 2019.

CPRI Specification V7.0 (Oct. 9, 2015), Common Public Radio Interface (CPRI); Interface Specification, 128 pages.

ECPRI Specification V2.0 (May 10, 2019), Common Public Radio Interface; eCPRI Interface Specification, 109 pages.

IEEE Standard for Local and metropolitan area network, Station and Media Access Control Connectivity Discovery, IEEE Std 802.1AB™—2016.

IEEE Std 1914.3™—2018, IEEE Standard for Radio over Ethernet. Encapsulations and Mappings, 3 Park Avenue, New York, NY 10016-5997, USA.

Oran Alliance, Operator Defined Next Generation RAN Architecture and Interfaces, 2019, www.o-ran.org.

* cited by examiner

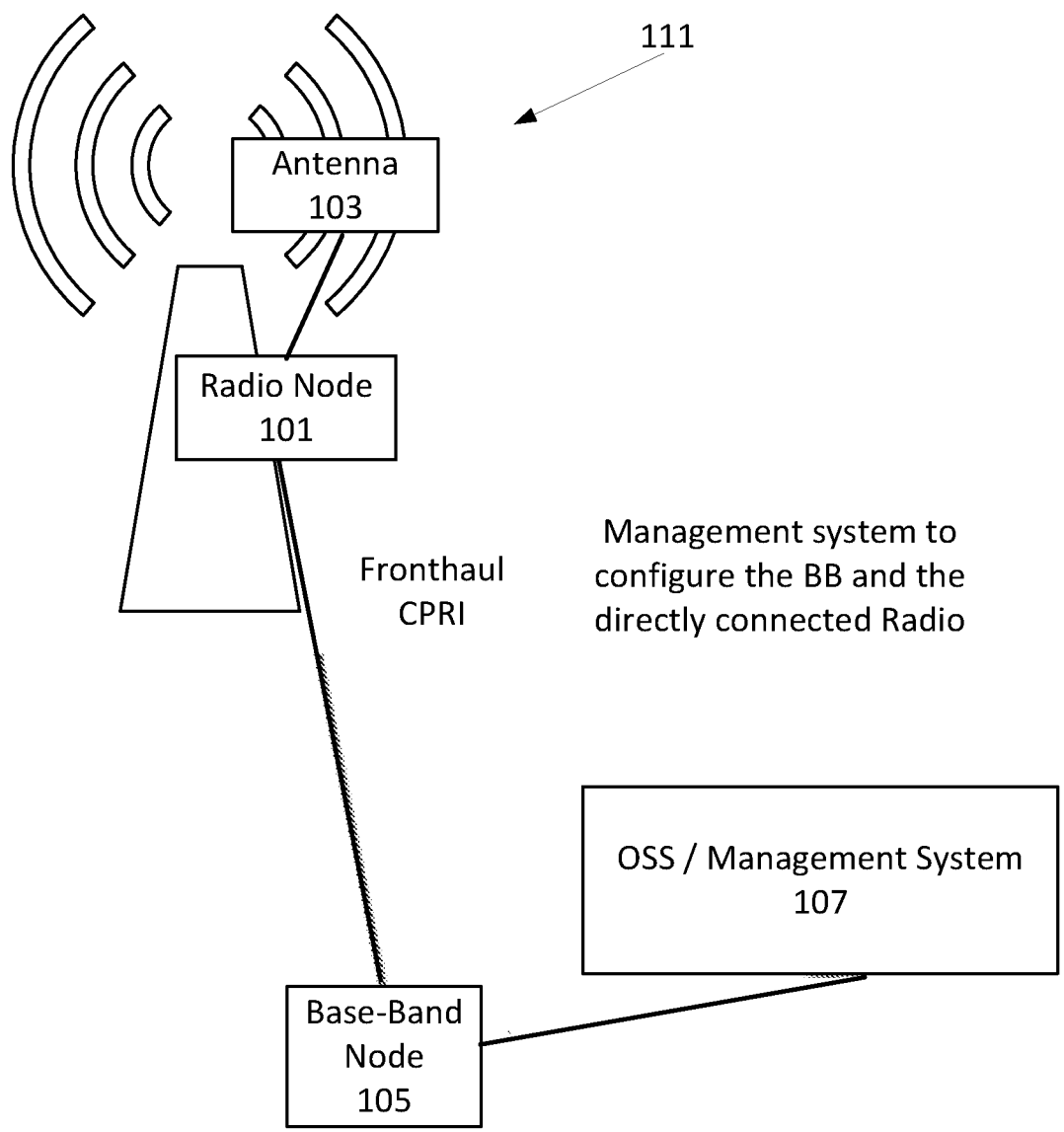

Radio seen from above

Radio seen from above

METHODS OF OBTAINING RADIO ACCESS NODE INSTALLATION DATA AND RELATED USER EQUIPMENT DEVICES, RADIO NODES, AND MANAGEMENT NODES

PRIORITY CLAIM

This application is a national stage of International Application No. PCT/IB2019/061269, filed Dec. 23, 2019, the entire disclosure of which is fully incorporated by reference herein for all purposes.

TECHNICAL FIELD

The present disclosure relates generally to communications, and more particularly to communication methods and related devices and nodes supporting wireless communications.

BACKGROUND

In a roll out of a mobile network there is a planning phase to define where and how to arrange the Radio/Antenna equipment/nodes and the Base-Band (BB) equipment/nodes, also called Radio Access Network (RAN) compute equipment. All Radio placement and antenna directional data and related configuration parameters and settings are planned in advance and prepared in configuration-files in the Operations Support System (OSS)/Management systems for further installation after the physical deployment of Radio and BB equipment. There is a planning of how and where to deploy the transport equipment between the Radio and BB equipment/nodes, what ports of the Radio/BB equipment/nodes to connect into what ports on the transport equipment, and if applicable, also configuration parameters and settings of transport equipment/nodes. Traditionally, there has been a direct physical connection between Radio and BB equipment/nodes for a base station 111 on the same or remote site, as shown in FIG. 1A which illustrates a traditional deployment of Antenna 103, Radio node 101, and Base-Band node 105 with a Common Public Radio Interface (CPRI) connection (see http://www.cpri.info/spec.html), where these types of connections may be referred to as fronthaul connections (e.g., fronthaul CPRI connections). In FIG. 1A, the OSS/Management system 107 may configure base-band node 105 and the directly connected radio node 101. In FIG. 1B, base-band functionality may be divided between a base-band distributed unit (BB-DU) 105a and a base-band centralized unit (BB-CU) 105b, both of which may have connectivity with the OSS/Management system 107. A connection between radio node 101 and BB-DU 105a may be provided using a fronthaul CPRI and/or a packet fronthaul Enhanced CPRI (eCPRI) (see http://www.cpri.info/spec.html5), and connection between BB-DU 105a and BB-CU 105b may be provided using a midhaul Higher Layer Split (HLS) (also referred to as an F1 interface).

With 5$^{th}$ Generation (5G) networks, new packet-based connections are defined, such as 3GPP HLS in the Midhaul domain, and Open RAN (ORAN) Lower Layer Split (LLS) in the Fronthaul domain. The CPRI forum has defined a packet variant of CPRI called Enhanced CPRI, and this connection between Radio and BB nodes is defined (referred to as eCPRI) that allows for indirectly connected Radio and BB equipment/nodes with a packet network (including switches/routers) in-between, and this may enable increased flexibility. This type of connection is referred to as Packet Fronthaul. For example, Radio and BB node relations can be changed by parameter reconfiguration at any time after deployment. FIG. 2 illustrates an example of a network with the new 5G architecture providing a centralized architecture with eCPRI connections over a packet transport network 215 (also referred to as a transport network and/or packet network) including switches/routers 209a1, 209a2, 209b1, and 209b2.

As shown in FIG. 2, each of antennas 203a1 and 203a2 of base station 211a is coupled with a respective one of radio nodes 201a1 and 201a2, and each of antennas 203b1 and 203b2 of base station 211b is coupled with a respective one of radio nodes 201b1 and 201b2. Moreover, radio node 201a1 of base station 211a may be coupled with base-band node 205a through switches/routers 209a1 and 209a2, radio node 201a2 may be coupled with base-band node 205b through switches/routers 209a1 and 209a2, and radio nodes 201b1 and 201b2 may be coupled with base-band node 205c through switches/routers 209b1 and 209b2. OSS/Management System 207 may thus configure base-band and radio nodes that are not directly connected, and OSS/Management System 207 may also configure transport nodes (e.g., switches/routers of the packet transport network).

The work effort in the planning phase of a mobile network rollout may be large and may drive Operational Expenditures (OPEX). With the introduction of 5G with a tighter grid (Inter Site Distances (ISDs) using, e.g., small cells), there may be even more planning work. At the installation time, the planned antenna placement is used, but often the planned placement must be adjusted to the real physical environment, and these adjustments may not be documented. There may also be situations when adjustments are made after installation due to changes in the surrounding environment without being documented. There may also be a high probability for mistakes/errors in planning, physical installation of connections and/or configuration parameters for Radio, BB and/or Transport equipment/node ports, and this may increase costs for troubleshooting and expensive extra site visits due to Network Roll Out (NRO) Cost of Sales (CoS) and/or time spent on site for installation.

Accordingly, there continues to exist a need for more efficient network base station installation.

SUMMARY

According to some embodiments of inventive concepts, methods may be provided to operate a User Equipment (UE) device. Installation data relating to an antenna of a radio access network (RAN) node is obtained, wherein the installation data comprises physical installation data including at least one of a height of the antenna, a direction of the antenna, and/or a tilt of the antenna. The installation data is transmitted from the UE device to a management system for a wireless communication network including the RAN node.

According to some other embodiments of inventive concepts, methods may be provided to operate a radio node for a Radio Access Network (RAN) node including an antenna associated with the radio node. Installation data relating to the RAN node is obtained. The installation data is transmitted from the radio node through a transport node to a management system for a wireless communication network including the RAN node.

According to still other embodiments of inventive concepts, methods may be provided to operate a management node of a wireless mobile/cellular network. Installation data relating to an antenna of a radio access network (RAN) node is received. Responsive to receiving the installation data, documentation of an installation of the RAN node is generated based on the installation data. The documentation of the installation of the RAN node is stored in electronic memory.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 1A and 1B are diagrams illustrating deployment of a radio node, antenna, and base band node(s);

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1B:
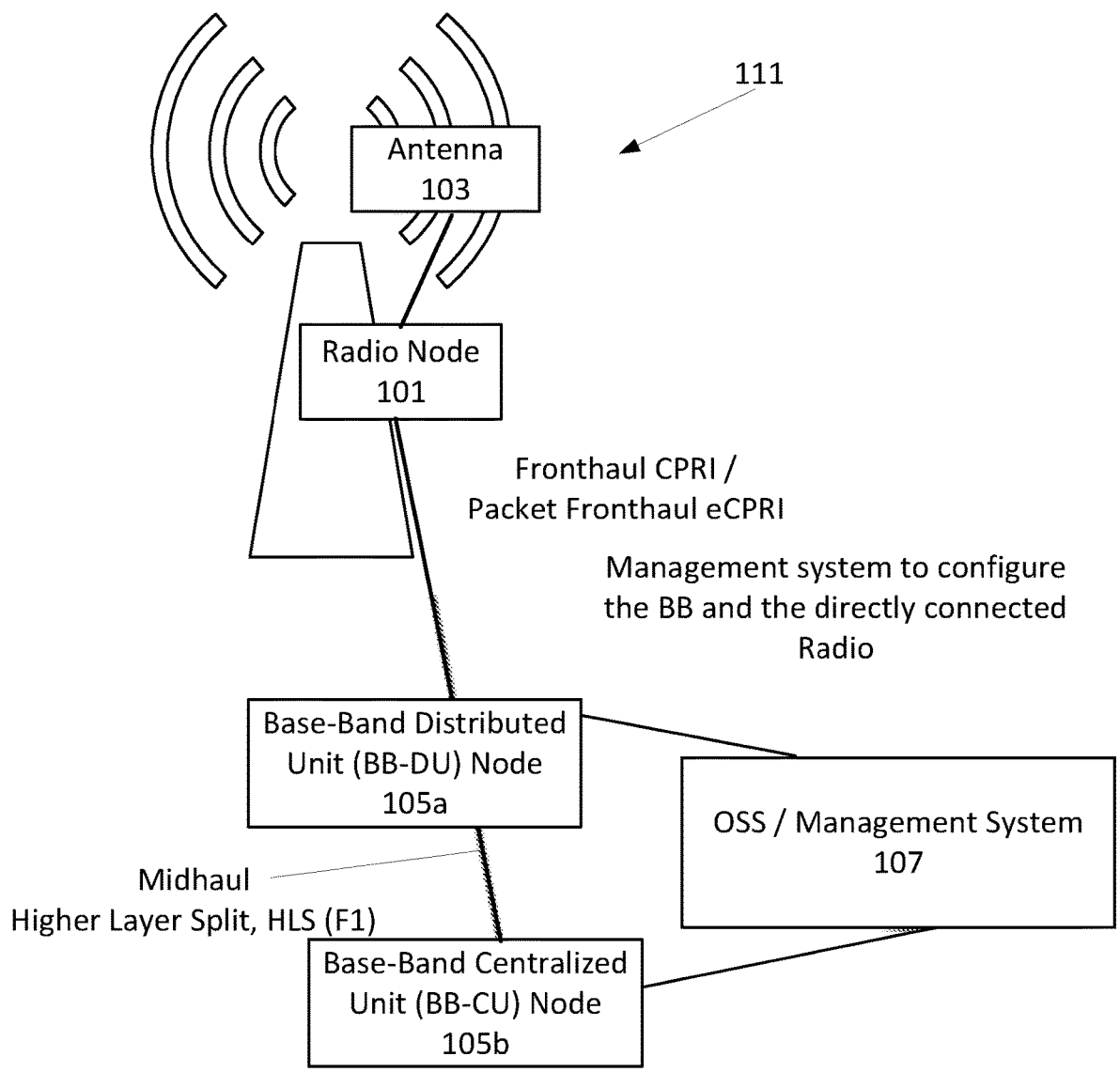
Figure 2:
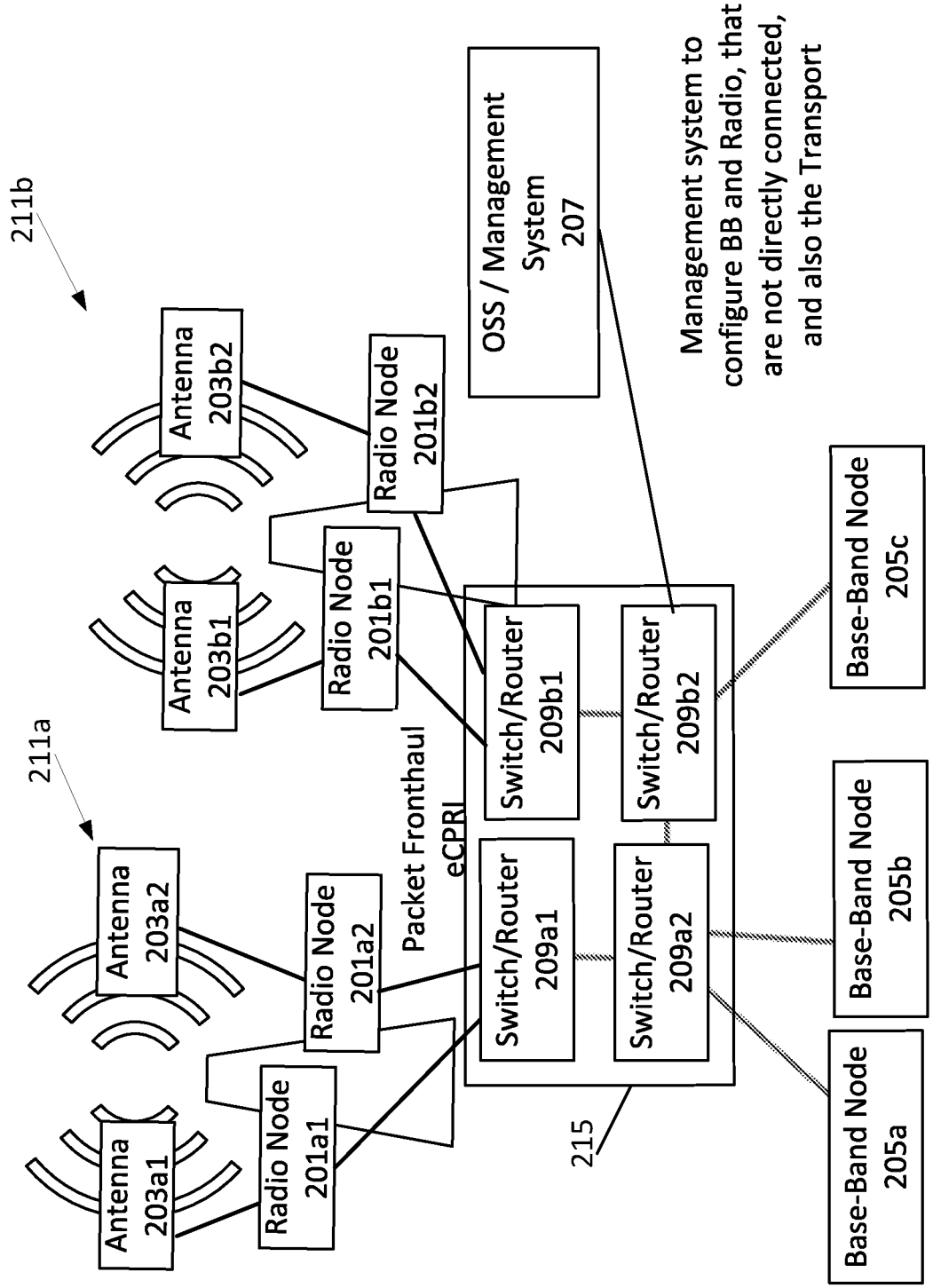
FIG. 2 is a diagram illustrating the 5G architecture.
Figure 3A:
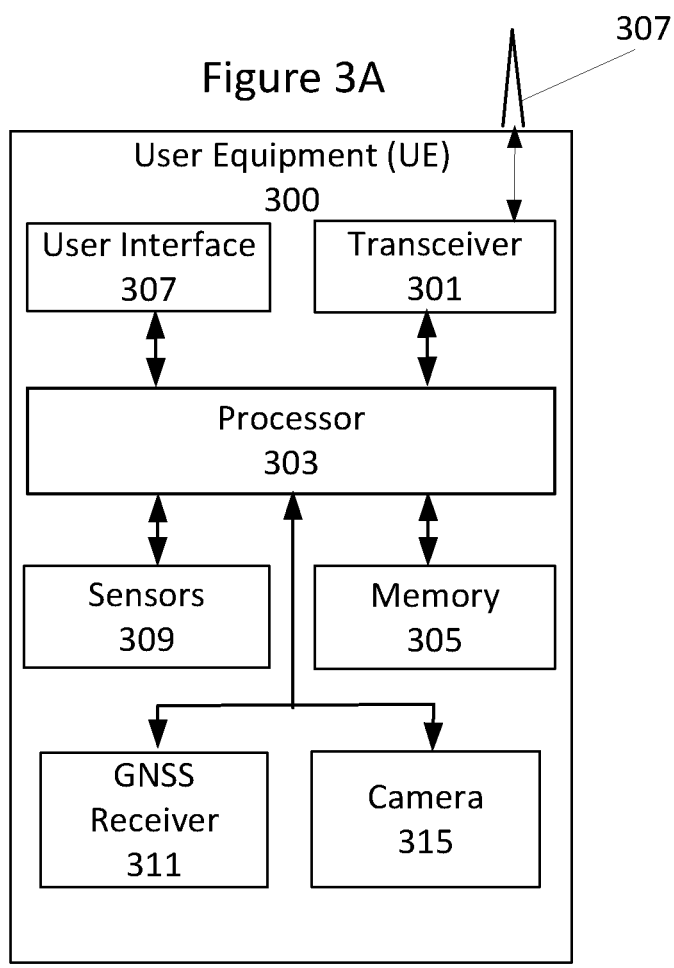
FIG. 3A is a block diagram illustrating a UE device (also referred to as a wireless device) according to some embodiments of inventive concepts.

FIG. 3A is a block diagram illustrating elements of a user equipment (UE) device 300 (also referred to as a mobile terminal, a mobile communication terminal, a wireless device, a wireless communication device, communication device, a wireless terminal, mobile device, a wireless communication terminal, user equipment, UE, a user equipment node/terminal/device, etc.) configured to provide wireless communication according to embodiments of inventive concepts. (UE device 300 may be provided, for example, as discussed below with respect to wireless device 1310 of FIG. 13.) As shown, UE device may include an antenna 307 (e.g., corresponding to antenna 1311 of FIG. 13), and transceiver circuitry 301 (also referred to as a transceiver, e.g., corresponding to RF transceiver circuitry 1322 of FIG. 13) including a transmitter and a receiver configured to provide cellular uplink and downlink radio communications with a base station(s) (e.g., corresponding to network node 1360 of FIG. 13, also referred to as a RAN node) of a radio access network. Transceiver circuitry 301 may also provide short range wireless communication (e.g., WiFi communication, Bluetooth (BT) communication, Near Field Communication (NFC), etc.). UE device may also include processing circuitry 303 (also referred to as a processor, e.g., corresponding to processing circuitry 1320 of FIG. 13) coupled to the transceiver circuitry, and memory circuitry 305 (also referred to as memory, e.g., corresponding to device readable medium 1330 of FIG. 13) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required.

Figure 13:
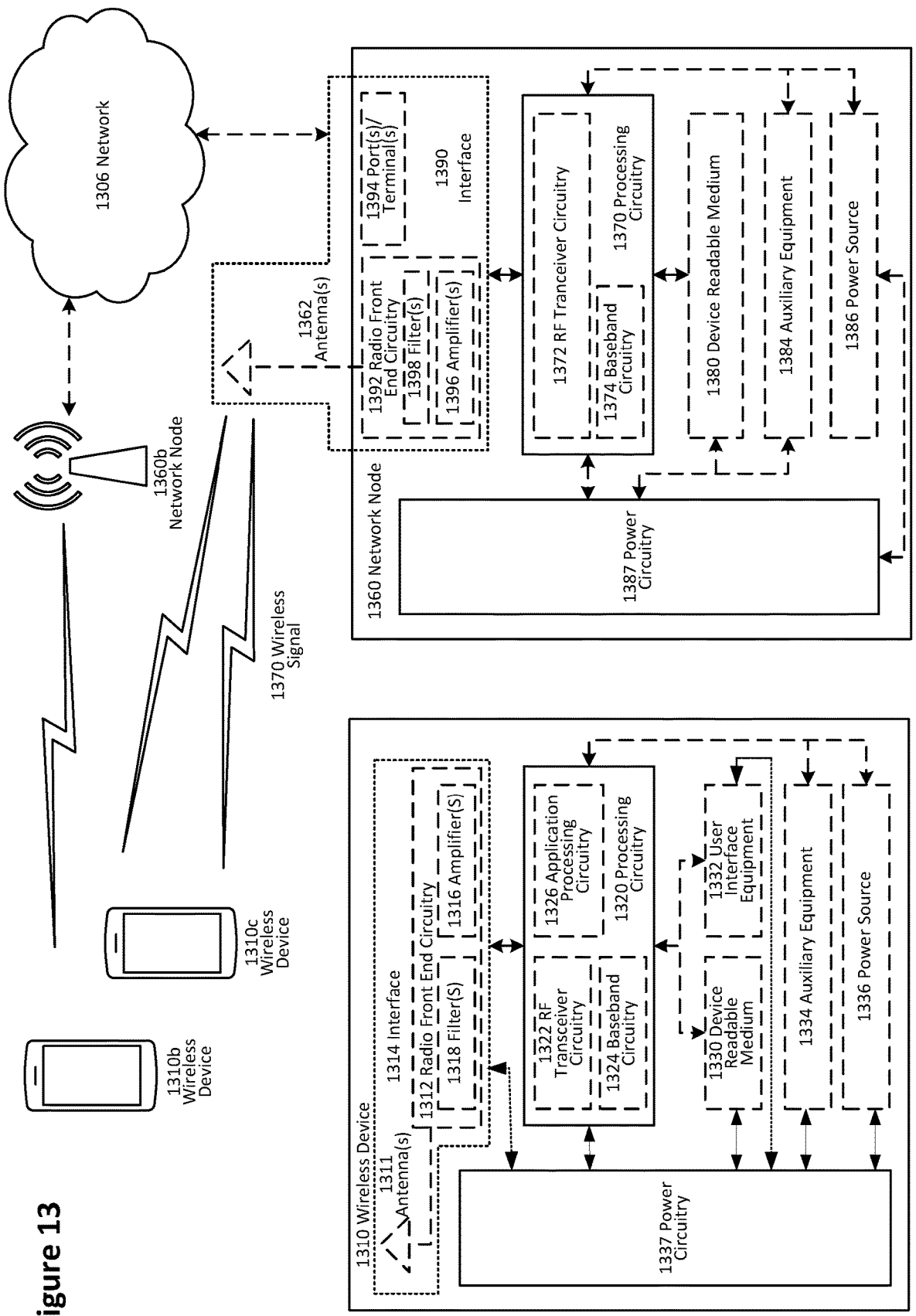
FIG. 13 is a block diagram of a wireless network in accordance with some embodiments.

UE device may also include a user interface 307 (also referred to as an interface; corresponding to interface 1314 of FIG. 13) coupled with processing circuitry 303, sensors 309 (e.g., accelerometers) coupled with processing circuitry 303, a Global Navigation Satellite System (GNSS) receiver 311 (also referred to as a Global Positioning System (GPS) receiver) coupled with processing circuitry 303, and/or a digital camera 315 coupled with processing circuitry 303. Associated apps (also referred to as applications or software applications) may be stored in memory 305 including instructions that allow processing circuitry 303 to process information from sensors 309, GNSS receiver 311, and/or camera 315.

Sensors 309 may include accelerometers having different orientations in UE device 300 configured to detect accelerations in different directions. A level app (sometimes referred to as a spirit level app) in memory 305 may provide instructions allowing processing circuitry 303 to use sensors 309 (e.g., accelerometers) to determine a tilt of an antenna (based on a tilt of the UE device) as discussed below with respect to FIG. 5C. A GNSS receiver app in memory 305 may provide instructions allowing processing circuitry 303 to use GNSS receiver 311 to determine a location, altitude, height, and/or direction of the antenna (based on a location, altitude, height, and/or direction of the UE device) as discussed below with respect to FIGS. 5A, 5B, and 5D. A camera app in memory 305 may provide instructions allowing processing circuitry 303 to obtain an image of a code/codes (e.g., bar codes, Quick Response codes (QR-codes), etc.) that can be used to identify various nodes/ports of a base station.

As discussed herein, operations of UE device may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules (e.g., instructions, apps, etc.) may be stored in memory circuitry 305, and these modules may provide instructions so that when instructions of a module are executed by processing circuitry 303, processing circuitry 303 performs respective operations (e.g., operations discussed below with respect to embodiments relating to UE devices, such as operations discussed with respect to UE device 409 of FIG. 4, UE device 509 of FIG. 5A, FIG. 5B, FIG. 5C, and/or FIG. 5D, and/or UE device 609 of FIG. 6, FIG. 7, FIG. 8, and/or FIG. 9, and/or operations of FIG. 10).

Figure 3B:
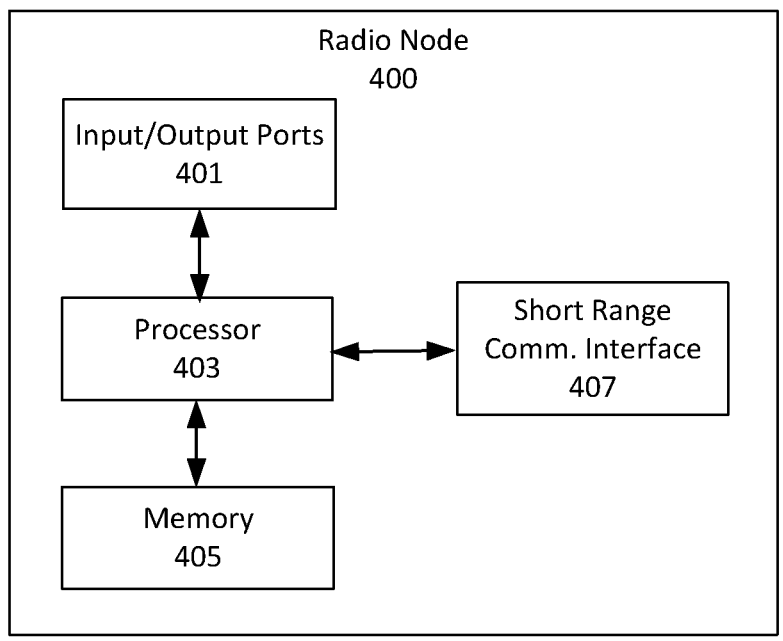
FIG. 3B is a block diagram illustrating a radio node according to some embodiments of inventive concepts.

FIG. 3B is a block diagram illustrating elements of a radio node 400 for a base station (where a base station may also be referred to as a Radio Access Network node, RAN node, network node, eNodeB/eNB, gNodeB/gNB, etc.) of a Radio Access Network (RAN) configured to provide cellular communication according to embodiments of inventive concepts. (A base station may be provided, for example, as discussed below with respect to network node 1360 of FIG. 13.) As shown, the radio node may include input/output ports 401 to provide coupling with other nodes/antennas of the base station and/or network. The input/output ports 401 may include antenna ports to provide coupling with one or more antennas, or antenna ports may be omitted if radio node 400 includes an integrated antenna/antennas. In addition or in an alternative, input/output ports may include transport ports to provide coupling with one or more transport nodes. In addition, radio node 400 may include a short range wireless communication interface 407 (e.g., a WiFi communication interface, a BlueTooth communication interface, etc.). The radio node 400 may also include processing circuitry 403 (also referred to as a processor) coupled to the input/output ports 401, the short range wireless communication interface, and memory circuitry 405 (also referred to as memory). The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required.

As discussed herein, operations of the radio node 400 may be performed by processing circuitry 403, and/or input/output ports 401. For example, processing circuitry 403 may control input/output ports 401 to transmit cellular downlink communications through an antenna over a radio interface to one or more UE devices and/or to receive cellular uplink communications through input/output ports 401 and antennas from one or more UE devices over a radio interface. Similarly, processing circuitry 403 may control input/output ports 401 to transmit/receive communications to/from one or more transport nodes. Processing circuitry 403 may also control short range wireless communication interface to transmit/receive communications to/from the UE device as discussed in greater detail below. Moreover, modules may be stored in memory 405, and these modules may provide instructions so that when instructions of a module are executed by processing circuitry 403, processing circuitry 403 performs respective operations (e.g., operations discussed below with respect to embodiments relating to radio nodes, such as operations discussed with respect to integrated radio/antenna node 415 of FIG. 4, integrated radio/antenna node 515 of FIG. 5A, FIG. 5B, FIG. 5C, and/or FIG. 5D, radio node 611 of FIG. 6, FIG. 7, FIG. 8, and/or FIG. 9, and/or integrated radio/antenna node 641 of FIG. 6, FIG. 7, FIG. 8, and/or FIG. 9, and/or operations of FIG. 11).

Figure 3C:
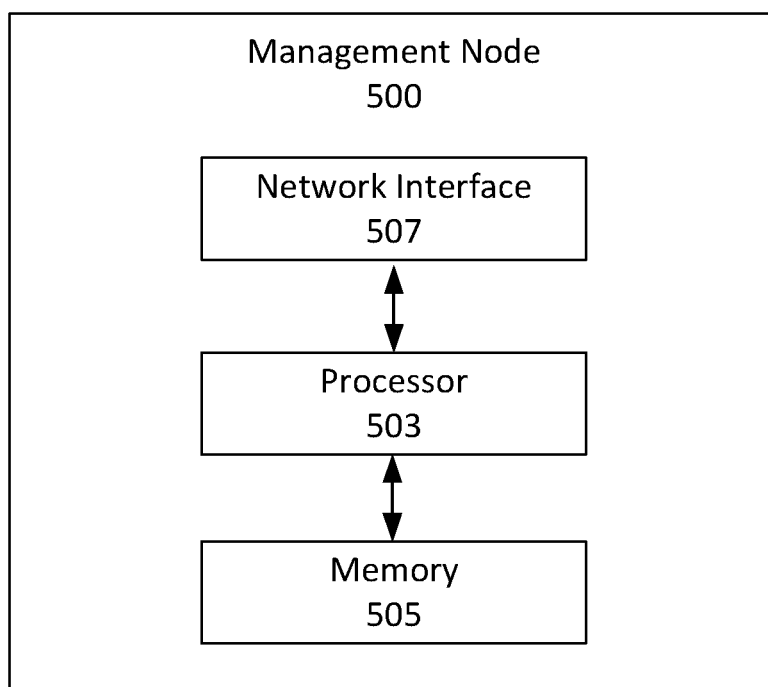
FIG. 3C is a block diagram illustrating a management node according to some embodiments of inventive concepts.

FIG. 3C is a block diagram illustrating elements of a management node 500 (e.g., a node of an OSS/management system) of a communication network configured to provide cellular communication according to embodiments of inventive concepts. As shown, the management node may include network interface circuitry 507 (also referred to as a network interface) configured to provide communications with other nodes of the core network and/or the radio access network (RAN) of the wireless network. The management node may also include processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required.

As discussed herein, operations of the management node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to embodiments relating to management nodes, such as operations discussed with respect to OSS/Management System node 631 of FIG. 6, FIG. 7, FIG. 8, and/or FIG. 9, and/or operations of FIG. 12).

Some embodiments of inventive concepts are based on using a user equipment (UE) device with apps (also referred to as applications) on site that can automatically identify the Radio/Antenna equipment/nodes as such, and/or the position(s) and direction(s) of the Radio/Antenna including its connection(s) to transport equipment/nodes. The UE device can also be used to identify BB and Transport equipment/nodes if they are not already automatically identified via the port connections. In addition, the UE/app can automatically send the information to management node 500 of an OSS/Management system.

Several methods can be used to identify equipment/nodes, connection ports, etc., according to embodiments of inventive concepts. For example, short-range wireless or bar-codes/QR-code(s) may be used. Assembled data can automatically be sent from the UE device via wireless network to OSS/management systems or transferred back to Radio/Transport equipment/nodes for further automatic transfer to management systems.

According to some embodiments of inventive concepts, more efficient documentation of a base station installation data may be provided. Some embodiments may reduce the planning and preparation work including documentation of the system and physical position/location of the site equipment (also to produce the configuration data, as discussed in greater detail below). Some embodiments may also reduce/minimize risk of errors from mistakes that occur during physical installation of equipment and/or mismatches in configuration data between Radio/Antenna, BB and Transport equipment/nodes, and/or time required for correction of installation errors may be reduced. Some embodiments may also simplify processes to handle changes in the network and may reduce/minimize inconsistency in documentation.

At installation, a UE device is used to identify equipment/node-IDs and/or physical installation data, for example, using short-range wireless connection alternatives and/or scanning bar-codes/QR-codes. Wireless alternatives can include NFC (Near Field Communication) which may not require base station equipment to be powered. WiFi and Bluetooth are other alternatives. Such operations are discussed below with respect to operation 1 of FIG. 4.

For a given item of equipment/node, connection/port-IDs and the transport port to which it is connected can also be identified using bar-code/QR-code methods.

Another method is that port/node IDs can be identified directly by the transport equipment/nodes if the Radio/Antenna equipment/nodes have a capability to announce equipment/Port-ID over its transport connection/port to the transport equipment/nodes.

Figure 4:
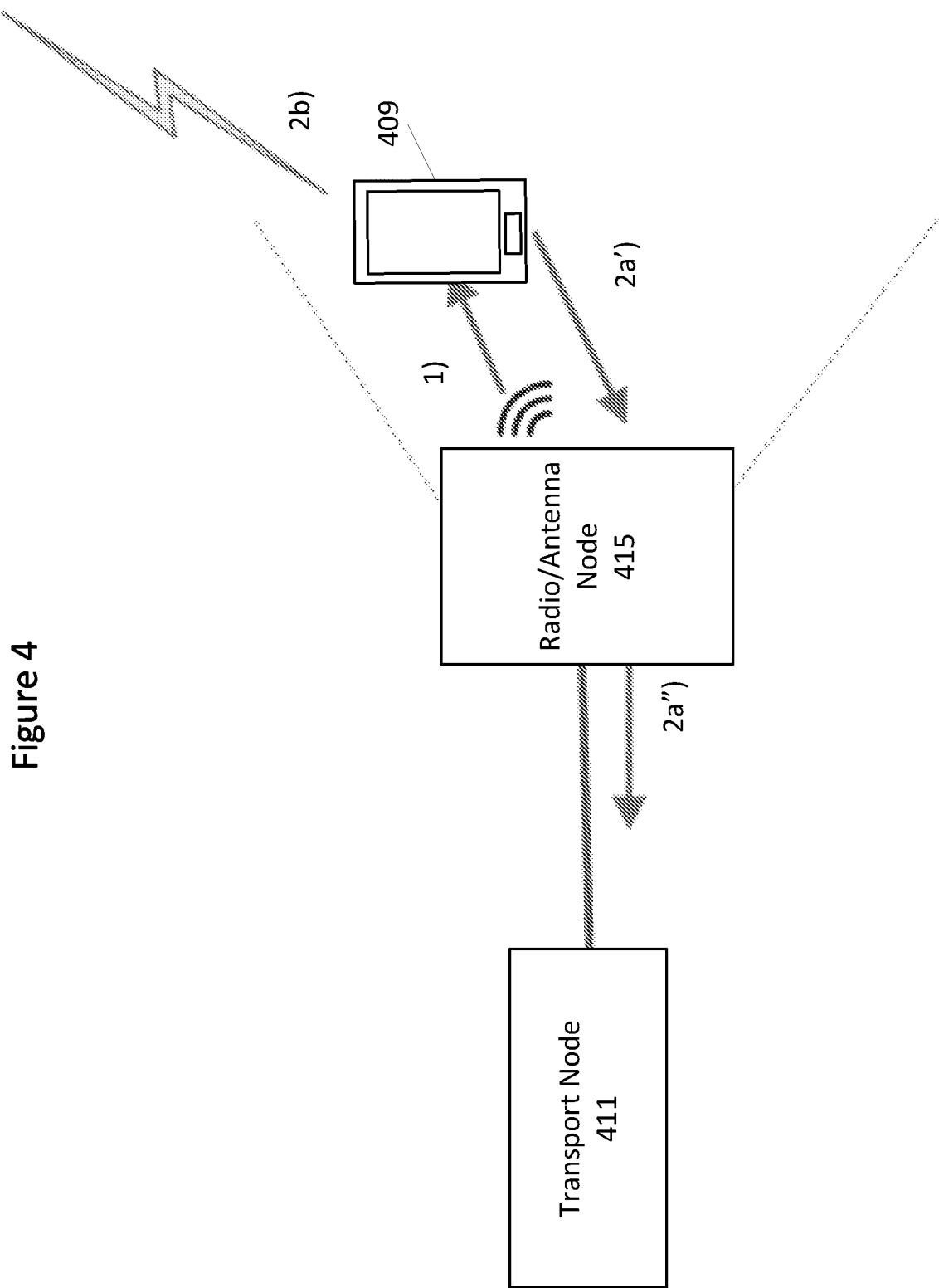
FIG. 4 is a block diagram illustrating operations of a UE device and a radio node exchanging data according to some embodiments of inventive concepts.

The UE may assemble port/node IDs and/or physical installation data (as shown in FIG. 4) and then send all assembled data to the network management system either via the Radio/Transport equipment/node and fixed connection (as discussed with respect to operations 2a' and 2a" of FIG. 4), or via wireless mobile/cellular network (as discussed with respect to operation 2b of FIG. 4).

FIG. 4 illustrates equipment/node identification and exchange of data. In FIG. 4, Radio/Antenna node 415 may be an integrated radio/antenna node installed on a base station, or a separate radio node and antenna that are coupled via a cable and/or port. Transport node 411 may be a packet network router/switch or passive/active optical network node that provides a data path to an OSS/management system node of the mobile/cellular network. At operation 1 of FIG. 4, UE device 409 (provided according to the structure of UE device 300 of FIG. 3A) may obtain information regarding the radio/antenna node. As discussed above, for example, UE device 409 may receive node identifiers IDs for the antenna and/or radio node (which may be separate or integrated) and/or associated base-band node and/or associated transport node, either wirelessly (e.g., using a short range wireless connection such as NFC, WiFi, Bluetooth, etc.) or optically using a camera app to capture an identifying code such as a bar code and/or a QR code provided on the respective antenna, radio node, transport node, and/or baseband node. The UE device may also obtain physical installation data regarding position and/or orientation of the antenna as discussed in greater detail below. UE device 409 may assemble this node ID and/or physical installation data for the radio/antenna node 415 of the base station and transmit this assembled data according to either operation 2a' or operation 2b.

According to embodiments of operation 2a'/2a" of FIG. 4, UE device 409 may transmit the assembled data using a short range wireless communication (e.g., WiFi, Bluetooth, etc.) at operation 2a' through the antenna and/or radio node or the integrated radio/antenna node that includes a short range communication transceiver (shown as radio/antenna node 415 in FIG. 4), and the radio/antenna node 415 may transmit the assembled data at operation 2a" through the transport node to a node of the OSS/management system of the mobile/cellular network. In such embodiments, the assembled data may be transmitted to transport node 411 by including the assembled data as a vendor specific attribute (VSA) in a frame (e.g., a CPRI frame, eCPRI frame, Link Layer Discovery Protocol (LLDP) frame, etc.). According to embodiments of Operation 2b, UE device 409 may transmit the assembled data to a node of the OSS/management system via another network base station that is fully operational using a mobile/cellular network connection/communication.

Figure 5C:
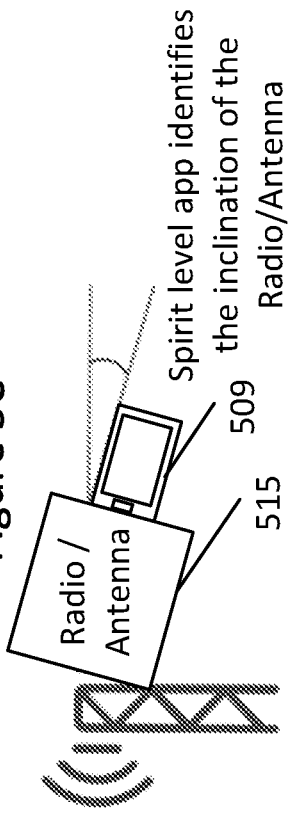
FIGS. 5A, 5B, 5C, and 5D are diagrams illustrating physical installation data that may be obtained by a UE device according to some embodiments of inventive concepts.
Figure 5D:
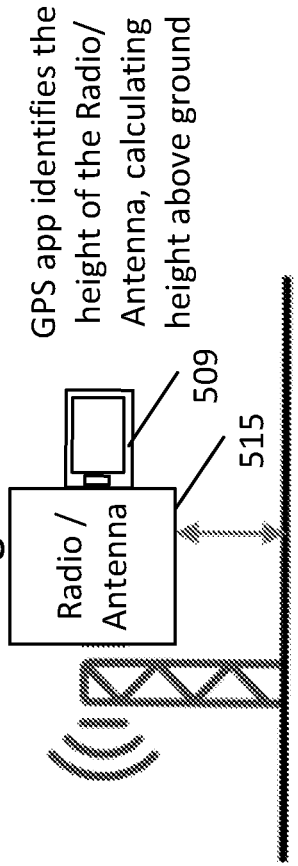
Figure 5A:
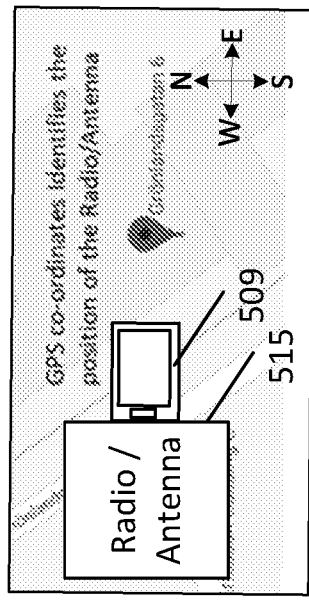
Figure 5B:
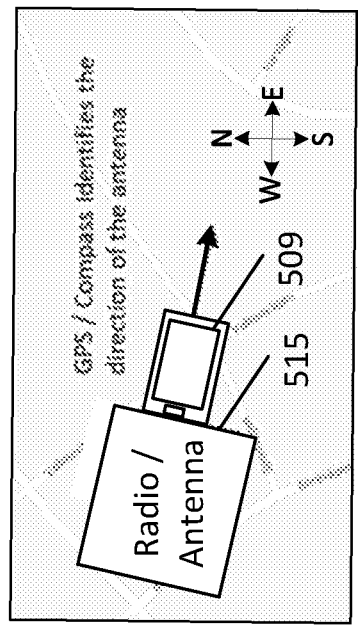

The UE may also identify additional Radio/Antenna physical installation data that is related to a position (e.g., location, height, etc.) and/or orientation (e.g., direction, vertical tilt or inclination/declination angle, etc.) of the antenna. Additional Radio/Antenna geometrical physical installation data that may be identified is shown in FIGS. 5A, 5B, 5C, and 5D and may include:

Location (e.g., GNSS/GPS coordinates) of the Radio/Antenna (also referred to as position, e.g., obtained using a Global Navigation Satellite System (GNSS) app and GNSS receiver in the UE) may be determined as shown in FIG. 5A;

Direction (e.g., compass direction) of the Radio/Antenna (e.g., obtained using a GNSS/Compass app and GNSS receiver in the UE) may be determined as shown in FIG. 5B;

Tilt of the Radio/Antenna (e.g., provided as an inclination/declination angle obtained using a spirit level app and sensors in the UE) may be determined as shown in FIG. 5C;

Height of the Radio/Antenna (e.g., obtained using a GNSS app and GNSS receiver that provides altitude of the UE device and ground height at the location that are used together to calculate height above ground) may be determined as shown in FIG. 5D.

As shown in FIGS. 5A, 5B, 5C, and 5D, the UE device may be held/placed against a particular surface of the antenna, and while held/placed against this surface, various sensors/apps in the UE device may determine the antenna position (e.g., based on information from a GNSS app), the antenna direction (e.g., based on information from a GNSS/compass app), the antenna vertical tilt (e.g., provided as an inclination/declination angle relative to horizontal based on information from a level app), and/or the antenna height relative to ground (e.g., based on information from a GNSS app).

According to some embodiments, the UE device may be held by the user physically against the antenna to provide that the position/orientation of the UE device accurately reflects the position (e.g., location, height, etc.) and/or orientation (e.g., direction, tilt, etc.) of the antenna. For example, one end (e.g., a microphone end) of the UE device may be held flush against the antenna with the touch screen facing up. The installation app may provide a prompt (e.g., a text, audio, or video prompt) for the User to hold the UE device against the antenna in the proper position, and the UE device may accept user input (e.g., via the touch screen) to indicate that the UE device is in the proper position. Responsive to receiving this user input (that the UE device is in the proper position), the installation app may use other apps (e.g., a GNSS app, a compass app, a level app, etc.) to determine physical installation data for the antenna (e.g., based on the location, height, direction, tilt, etc. of the UE device). Once the installation app has determined the physical installation data for the antenna, the UE device may provide a notification to the user that the user can move the UE device away from the antenna.

According to some embodiments, the antenna may include a guide to assist in placing the UE device in the proper position when obtaining the physical installation data. For example, the antenna may include markings to show where to place the microphone end of the UE device when obtaining the physical installation data. In addition or in an alternative, the antenna may include a physical structure (e.g., a shaped recess) configured to receive the microphone end of the UE device to force the proper position when obtaining the physical installation data.

If the UE device uses a wireless mobile/cellular network connection/communication to send assembled data as discussed with respect to operation 2b of FIG. 4, the assembled data may be sent using a traditional secure connection to the operator management system.

If the UE device uses a short-range wireless connection to the Radio/Antenna equipment/node 515, the radio/antenna equipment/node 515 will receive all the assembled data (e.g., as discussed with respect to operation 2a' of FIG. 4). When the radio/antenna equipment/node 515 is powered up and connected to a transport node (e.g., a packet network switch) that is activated, then the assembled data can be sent using different methods. Four different methods are discussed below.

Figure 6:
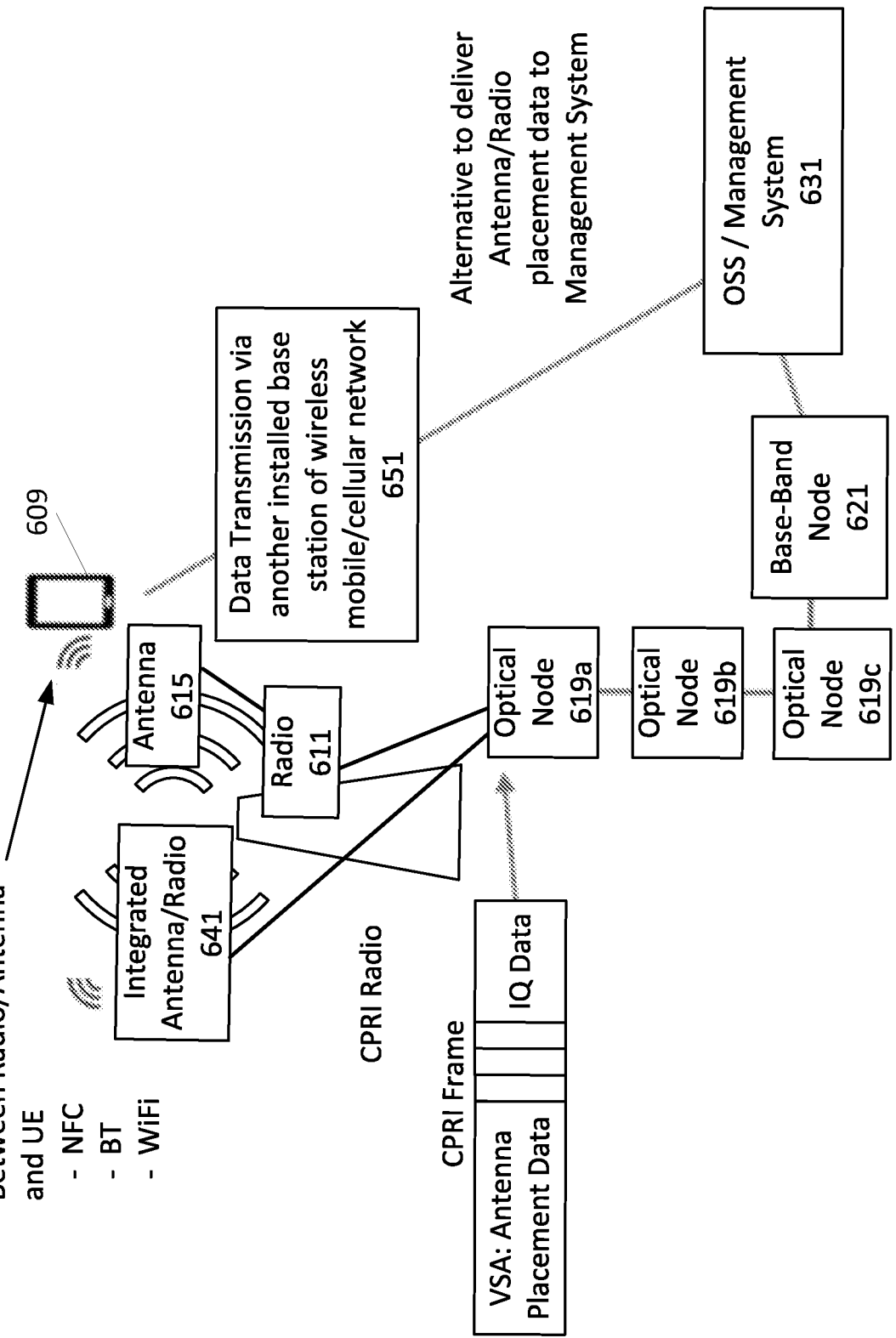
FIGS. 6, 7, 8, and 9 are diagrams illustrating transfer of installation data according to some embodiments of inventive concepts.

In an example of FIG. 6, the Radio node 611 and BB node 621 may be connected using a CPRI connection via an optical network/connection, for example, including optical filters 619a, 619b, and 619c. The assembled data in Radio node 611 may be added into a CPRI frame as a Vendor Specific Attribute (VSA). The VSA may be transparently transported through the optical network/connection to BB node 621 that terminates the CPRI connection and that reads out the assembled data from the VSA field, and the BB node 621 may then transmit the assembled data to a node of OSS/management system 631 for further processing.

FIG. 6 illustrates an embodiment to transfer Radio/Antenna physical installation data and/or identifier data using a CPRI optical network (including optical filters 619a, 619b, and 619c). As shown, a short range wireless connection/communication (e.g., WiFi, BlueTooth, NFC, etc.) between UE device 609 (provided as discussed above with respect to FIG. 3A) and radio node 611 and/or antenna 615 may be used by UE device 609 to obtain identifiers relating to the antenna 615 and/or radio node 611. For example, UE device 609 may use the short range wireless connection/communication to obtain identifier data relating to antenna 615, radio node 611, and/or base-band node 621, for example, including an identifier of radio node 611, an identifier of antenna 615, an identifier of BB node 621 to which radio node 611 is connected, an identifier of a port of radio node 611 to which antenna 615 is connected, an identifier of a port of BB node 621 to which radio node 611 is connected, an identifier of a port of radio node 611 to which BB node is connected, etc. UE device 609 may also obtain physical installation data for antenna 615 (e.g., position and orientation data). With an integrated antenna/radio node 641, a single identifier for the antenna/radio node 641 may be provided (i.e., without separate IDs for antenna and radio node).

UE device 609 may then transmit the assembled data (e.g., including the identifier data and/or the physical installation data) to a node of the OSS/Management System 631. This data may either be transmitted via a short range wireless connection/communication to antenna 615 and/or radio node 611 (and then transmitted from radio node 611 through optical nodes 619a-c (e.g., passive or active optical equipment such as optical filters and/or optical switches) and base-band node 621) to a node of the OSS/Management system 631. Yet another option is that UE device 609 may transmit the assembled data via another installed base station of the wireless mobile/cellular network at block 651.

Figure 7:
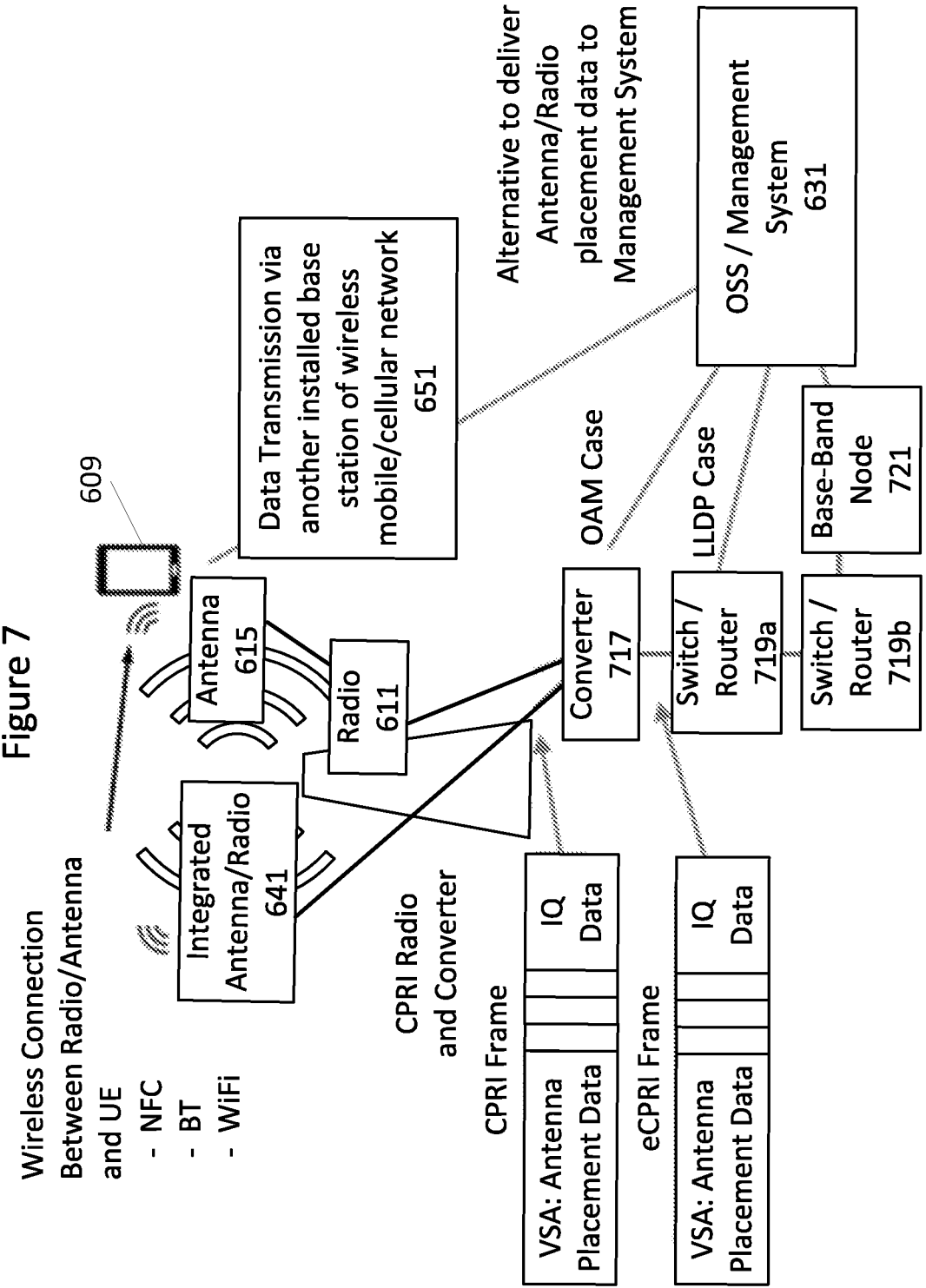

In the example of FIG. 7, radio node 611 is connected using a CPRI connection to converter 717 that converts a CPRI frame from radio node 611 into an eCPRI frame for transport over a packet network/connection. The assembled data from the Radio node 611 is added into the CPRI frame as a VSA. At converter 717, several options are possible.

One option is that the VSA of the CPRI frame can be transparently mapped by converter 717 into the eCPRI frame, transported (through a packet network, e.g., including switches/routers 719a and 719b) to a base-band node 721, that reads out the data and sends it to a node of the OSS/management system 631.

Another option is that converter 717 reads out the assembled data from the VSA of the CPRI frame and sends it over an Operations Administration and Management (OAM) connection to a node of the OSS/management system 631.

Still another option could be that converter 717 reads out the assembled data from the VSA of the CPRI frame and sends it over an LLDP connection through a connected switch/router 719a, that in-turn sends the assembled data to a node of the OSS/management system 631. LLDP may be referenced at IEEE 802.1AB-2016—IEEE Standard for Local and metropolitan area networks—Station and Media Access Control Connectivity Discovery; Published 2016 Mar. 11; (https://standards.ieee.org/standard/802_1AB-2016.html). Yet another option is that UE device 609 may transmit the assembled data via another installed base station of the wireless mobile/cellular network at block 651.

Figure 8:
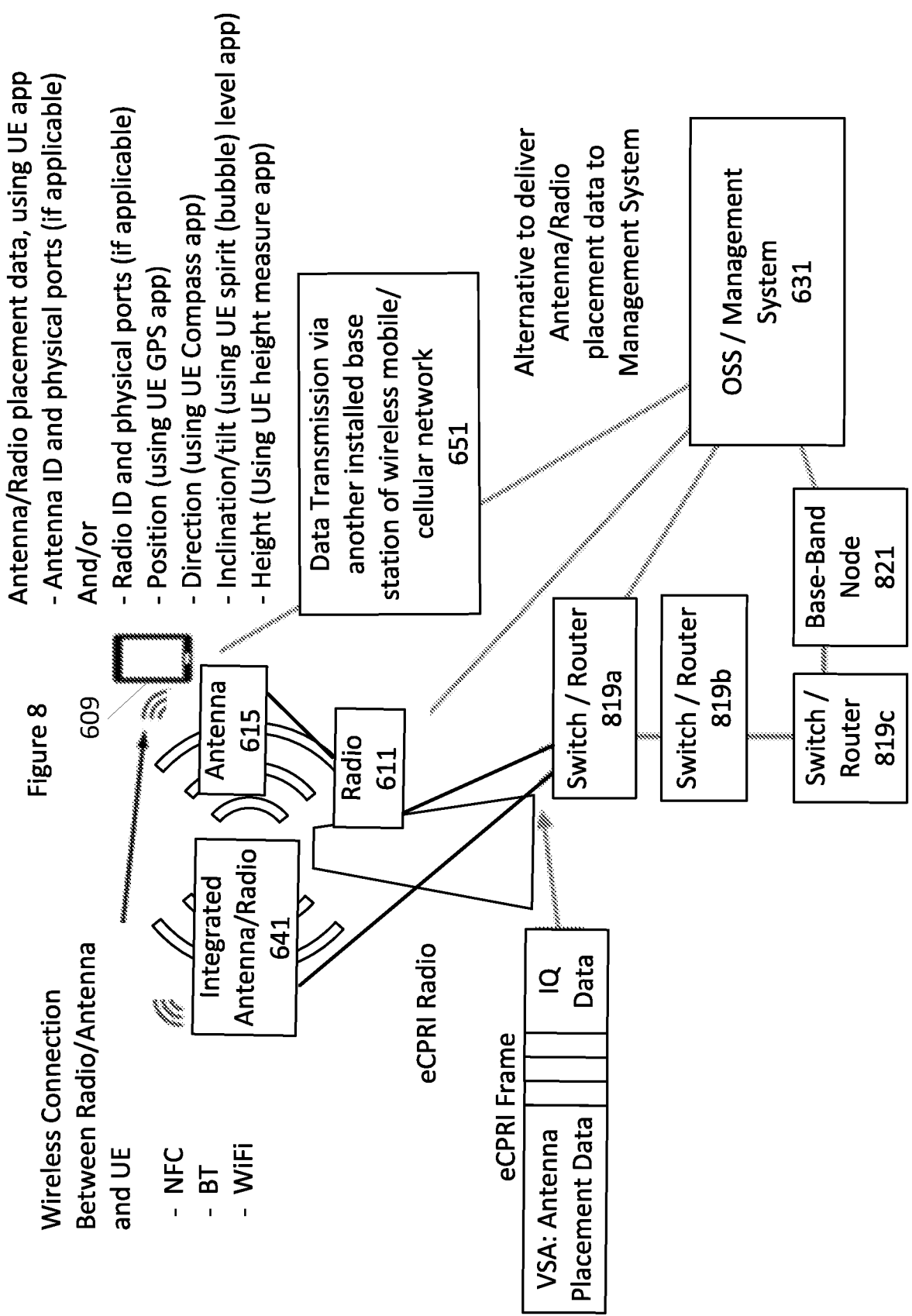

In the example of FIG. 8, radio node 611 is connected using an eCPRI connection through a packet network (e.g., including switches/routers 819a, 819b, and 819c) for transport over a packet network/connection. Several options to send the assembled data to a node of the OSS/management system are discussed below.

In FIG. 8, UE device 609 may thus obtain antenna/radio node physical installation data (e.g., antenna position, antenna direction, antenna tilt, antenna height, etc.) and/or identifier data (e.g., antenna identifier, radio node identifier, transport node identifier, port identifiers, etc.). The physical installation data may be obtained as discussed above with respect to FIGS. 5A, 5B, 5C, and 5D. The identifier data may be obtained, for example, via a short range wireless communication (e.g., NFC, Bluetooth, WiFi, etc.) from radio node 611 and/or antenna node 615, or via a camera.

One option is that the assembled data in the radio node 611 is added into the eCPRI frame as a VSA and transparently transported (through a packet network, e.g., including switches/routers 819a, 819b, and 819c) to a base-band node 821, where base-band node 821 reads out the data and sends it to a node of the OSS/management system 631.

Another option is that the radio node 611 sends the data over an OAM connection to the OSS/management system 631.

Still another option could be that the radio node 611 sends the assembled data over an LLDP connection to a connected switch 819a of a packet network, that in-turn sends the data to a node of the OSS/management system 631.

Yet another option is that UE device 609 may transmit the assembled data via another installed base station of the wireless mobile/cellular network at block 651.

Figure 9:
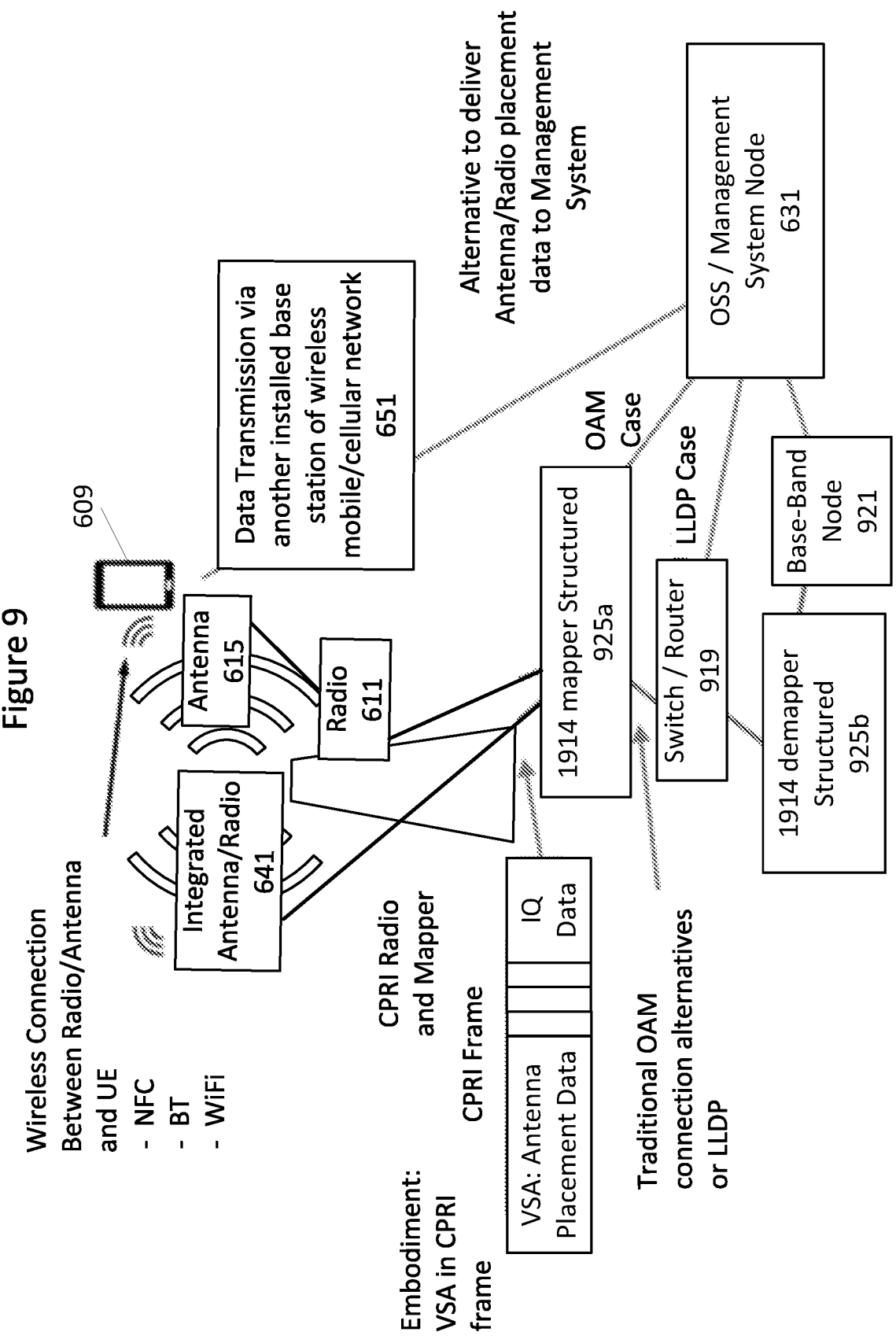

In the example of FIG. 9, the radio node 611 is connected using a CPRI connection to an IEEE 1914 CPRI-mapper function node 925a (also referred to as an ethernet mapper) that maps CPRI frames into an ethernet frame(s) for transport over a packet network/connection (e.g., including switch/router 919). Reference is made to IEEE 1914.3-2018 (IEEE Standard for Radio Over Ethernet Encapsulations and Mappings; COM/MobiNet-SC—Mobile Communication Networks Standards Committee; Published 2018 Oct. 5; (https://standards.ieee.org/standard/1914_3-2018.html)). At the 1914-mapper function node 925a several options are possible.

In FIG. 9, UE device 609 may thus obtain antenna/radio node physical installation data (e.g., antenna position, antenna direction, antenna tilt, antenna height, etc.) and/or identifier data (e.g., antenna identifier, radio node identifier, transport node identifier, port identifiers, etc.). The physical installation data may be obtained as discussed above with respect to FIGS. 5A, 5B, 5C, and 5D. The identifier data may be obtained, for example, via a short range wireless communication (e.g., NFC, Bluetooth, WiFi, etc.) from radio node 611 and/or antenna node 615, or via a camera.

One option is that the VSA (including the assembled data) can be transparently transported from mapper 925a through the packet network (e.g., including switch/router 919) and IEEE 1914 CPRI-demapper) to base-band node 921 where the 1914-frame (ethernet frame) is demapped (e.g., by ethernet demapper 925b) back to a CPRI frame and base-band node 921 reads out the assembled data and sends it to a node of the OSS/management system 631. In some embodiments, radio node 611 may provide the assembled data (e.g., including physical installation data and identifier data) in the VSA of an eCPRI frame, 1914 mapper structured 925a may provide the assembled data from the eCPRI frame through the packet network to 1914 demapper structured 925b.

Another option is that the 1914-mapper 925a reads out the assembled data and sends it over an OAM connection to a node of the OSS/management system 631.

Still another option is that the 1914-mapper 925a reads out the assembled data and sends it over an LLDP connection to a connected switch (e.g., switch/router 919), that in-turn sends the assembled data to a node of the OSS/management system 631.

According to some embodiments, a system application may be provided for automated configuration of installed equipment/nodes. In such embodiments, all assembled Antenna site physical installation data may be automatically sent to an OSS/management application to be stored as documentation of site installation. The OSS/management application may thus have access to all Radio Access Network (RAN) and Core equipment information and also transport network information. Based on the received new installation data and existing data, the OSS/management application may automatically generate applicable configuration data and parameters for the new installed and related Radio/Antenna, Baseband, transport and Core equipment/nodes. According to some embodiments of inventive concepts, more efficient documentation of a base station installation data may be provided. Some embodiments may reduce planning and preparation work and/or provide the configuration data and/or documentation of the system and physical location of the site equipment. Some embodiments may also reduce/minimize a risk of errors from mistakes in physical installation of equipment and/or mismatch in configuration data between Radio/Antenna, BB and/or Transport equipment/nodes, and/or time required for correction of installation errors may be reduced. Such embodiments may also simplify the process to handle changes in the network and/or reduce/minimize inconsistency in the documentation.

Some embodiments of inventive concepts may be based on using a UE device with apps on site to automatically identify the Radio/Antenna equipment/nodes as such, the position, location, height, tilt, and directions of the Radio/Antenna including connection(s) to transport equipment/nodes. The UE device can also be used to identify BB and Transport equipment/nodes if they are not already automatically identified via the port connection. This information can be automatically sent to an OSS/Management system application.

Several methods can be used to identify equipment/nodes, connection ports, etc. For example, short-range wireless connection or bar-code/QR-code may be used. Assembled data can automatically be sent from the UE device via a Wireless mobile/cellular network connection/communication to the OSS/management system and/or transferred back to equipment for further automatic transfer to management systems.

Operations of the user equipment, UE, device 300 (implemented using the structure of the block diagram of FIG. 3A) will now be discussed with reference to the flow chart of FIG. 10 according to some embodiments of inventive concepts. For example, modules may be stored in memory 305 of FIG. 3, and these modules may provide instructions so that when the instructions of a module are executed by respective UE processing circuitry 303, processing circuitry 303 performs respective operations of the flow chart.

At block 1010, processing circuitry 303 may provide a prompt through user interface 307 (e.g., a visual/text prompt on a touch sensitive display of user interface 307, an audio prompt through a speaker of user interface 307, etc.) for a user of UE device 300 to position UE device 300 physically against the antenna.

At block 1020, processing circuitry 303 may accept user input indicating that the UE device is physically positioned against the antenna (after providing the prompt). The user input may be accepted through user interface 307 (e.g., through a touch sensitive display of user interface 307, a physical button of user interface 307, voice command received through a microphone of user interface 307, etc.).

At block 1030, processing circuitry 303 may obtain installation data relating to an antenna of a radio access network (RAN) node, where the installation data may include physical installation data and/or identifier data.

The physical installation data may be obtained responsive to accepting the user input indicating that UE device 300 is physically positioned against the antenna, and the physical installation data may include at least one of a location of the antenna, a height of the antenna, a direction of the antenna, and/or a tilt of the antenna as discussed above, for example, with respect to FIGS. 5A 5B, 5C, and 5D. For example, processing circuitry 303 may obtain the location of the antenna using information from a Global Navigation Satellite System (GNSS) application running on the UE device (e.g., based on signals/information from GNSS receiver 311); processing circuitry 303 may obtain the height of the antenna using information from the GNSS application running on the UE device (e.g., based on signals/information from GNSS receiver 311); processing circuitry 303 may obtain the direction of the antenna using the GNSS application and/or compass application running on the UE device (e.g., based on signals/information from GNSS receiver 311); and/or processing circuitry 303 may obtain the tilt of the antenna using a level application running on the UE device (e.g., based on signals/information from sensors 309, such as accelerometers). By obtaining the physical installation data while the UE device is positioned against the antenna in a defined manner, a location, height, direction, and/or tilt of the UE device may be considered to the same as a location, height, direction, and/or tilt of the antenna.

At block 1030, obtaining the installation data may also include obtaining identifier data including an identification of a radio node of the RAN node that is associated with the antenna of the RAN node. If the radio node and the antenna comprise an integrated antenna/radio node, the identification of the radio node may be an identification of the integrated antenna/radio node. If the antenna is coupled with the radio node via a cable and an antenna port of the radio node, the identifier data may further include at least one of an identifier of the antenna and/or an identifier of the antenna port of the radio node.

According to some embodiments, the identifier data may further include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node.

According to some embodiments, the RAN node may include a transport node, and the identifier data may further include at least one of an identifier of the transport node that is coupled with the radio node, an identifier of a radio port of the transport node that is coupled with the radio node, and/or an identifier of a transport port of the radio node that is coupled with the transport node.

According to some embodiments of inventive concepts, processing circuitry 303 may obtain the identifier data at block 1030 via a short range wireless communication (e.g., a WiFi communication, a BlueTooth communication, a Near Field Communication, etc.) received from an element of the RAN node (e.g., as discussed above with respect to operation 1 of FIG. 4). According to some other embodiments of inventive concepts, processing circuitry 303 may obtain at least one identifier as a radio frequency identifier, RFID. According to still other embodiments of inventive concepts, processing circuitry 303 may obtain the identifier data optically using camera 315 of the UE device. Using camera 315, for example, processing circuitry 303 may accept a digital image of at least one of a bar code and/or a QR-code from the camera 315, from which the identifier data may be determined. For example, processing circuitry 303 may provide a prompt (e.g., a visual prompt through a display of user interface 307, an audio prompt through a speaker of user interface 307, etc.) for a user of the UE device to take a picture of the identifier data using camera 315, and processing circuitry 303 may obtain the identifier data using data from the camera 315 responsive to user input to capture an image.

At block 1040, processing circuitry 303 may transmit the installation data from UE device 300 through transceiver 301 to a management system for a wireless communication network including the RAN node. According to some embodiments, the RAN node for which the installation data is being collected may be a first RAN node, and the installation data may be transmitted (through transceiver 301) to the management system using a wireless mobile/cellular network communication via a second RAN node different than the first RAN node (e.g., as discussed above with respect to operation 2b of FIG. 4). According to some other embodiments, the installation data may be transmitted (through transceiver 301) to the management system using a short range wireless communication (e.g., WiFi, BluTooth, etc.) via the RAN node (e.g., as discussed above with respect to operation 2a' of FIG. 4). For example, a radio node of the RAN node may include a short range wireless communication receiver allowing the RAN node to receive the installation data from the UE device and forward the installation data to the management system.

At block 1050, processing circuitry 303 may provide an indication for the user through user interface 307 (e.g., providing a visual/text indication through a display of user interface 307, providing an audio indication through a speaker of user interface 307, etc.) that the physical installation data has been obtained after obtaining the physical installation data.

Figure 10:
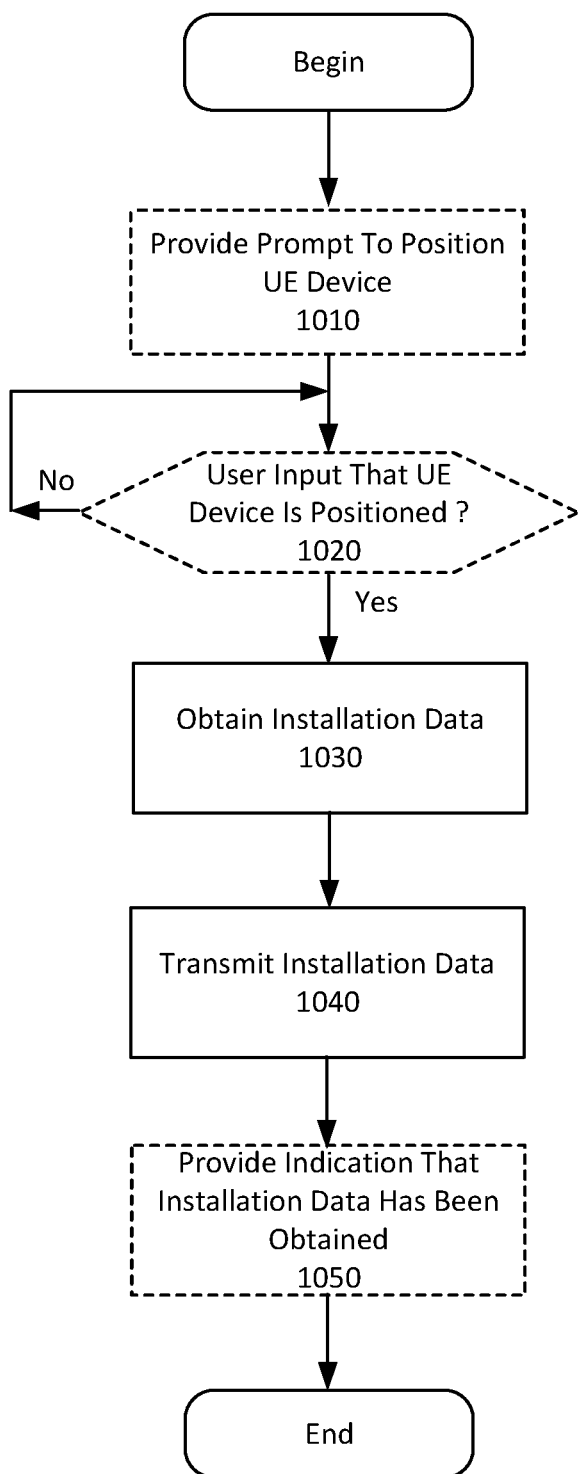
FIG. 10 is a flow chart illustrating operations of a UE device according to some embodiments of inventive concepts.

Various operations from the flow chart of FIG. 10 may be optional with respect to some embodiments of wireless devices and related methods. Regarding methods of some embodiments, for example, operations of blocks 1010, 1020, and/or 1050 of FIG. 10 may be optional.

Operations of a radio node 400 (implemented using the structure of FIG. 3B) of a RAN node will now be discussed with reference to the flow chart of FIG. 11 according to some embodiments of inventive concepts. For example, modules may be stored in memory 405 of FIG. 3B, and these modules may provide instructions so that when the instructions of a module are executed by respective radio node processing circuitry 403, processing circuitry 403 performs respective operations of the flow chart.

At block 1110, processing circuitry 403 may obtain installation data relating to the RAN node, and the installation data may include physical installation data relating to an antenna of the RAN node that is associated with radio node 400 and/or identifier data including an identification of the radio node. For example, the installation data may be received from a user equipment (UE) device using a short range wireless communication (e.g., a WiFi communication, a BlueTooth communication, etc.) that is received through short range wireless communication interface 407 as discussed above, for example with respect to operation 2a' of FIG. 4.

Obtaining the installation data may include obtaining the physical installation data including at least one of a location of the antenna, a height of the antenna, a direction of the antenna, and/or a tilt of the antenna.

Obtaining the installation data may also include obtaining the identifier data including an identification of the radio node 400. According to some embodiments of inventive concepts, the radio node and the antenna may be an integrated antenna/radio node, and the identification of the radio node may thus be an identification of the integrated antenna/radio node. According to some other embodiments of inventive concepts, the antenna may be coupled with the radio node via a cable and an antenna port of the radio node (included in input/output ports 401), and the identifier data may further include at least one of an identifier of the antenna and/or an identifier of the antenna port of the radio node. The identifier data may also include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node.

At block 1120, processing circuitry 403 may transmit the installation data (including the physical installation data and/or the identifier data) from the radio node through a transport node to a management system for a wireless communication network including the RAN node, as discussed above, for example, with respect to operation 2a" of FIG. 4. Transmission of installation data from the radio node to the management system according to some embodiments is further discussed above with respect to FIGS. 6, 7, 8, and 9. Processing circuitry 403, for example, may transmit the installation data to the transport node through a transport node port included in input/output ports 401.

According to some embodiments, the installation data may be transmitted as an attribute in a common public radio interface (CPRI) frame over a CPRI connection with the transport node, where the attribute may be a Vendor Specific Attribute (VSA) in a CPRI frame. According to some other embodiments, the installation data may be transmitted as an attribute in an enhanced common public radio interface (eCPRI frame) over an eCPRI connection with the transport node, where the attribute may be a Vendor Specific Attribute (VSA) in the eCPRI frame. According to still other embodiments, the installation data may be transmitted using an Internet Protocol (IP) communication. According to yet other embodiment, the installation data may be transmitted using an Ethernet communication, such as a Link Layer Discovery Protocol (LLDP) Ethernet communication.

Figure 11:
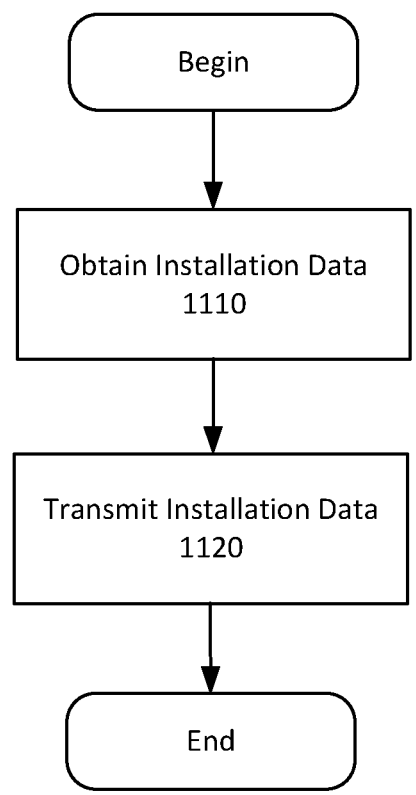
FIG. 11 is a flow chart illustrating operations of a radio node according to some embodiments of inventive concepts.

Various operations from the flow chart of FIG. 11 may be optional with respect to some embodiments of radio nodes and related methods.

Operations of a management node 500 (implemented using the structure of FIG. 3C) will now be discussed with reference to the flow chart of FIG. 12 according to some embodiments of inventive concepts. For example, modules may be stored in memory 505 of FIG. 3C, and these modules may provide instructions so that when the instructions of a module are executed by respective processing circuitry 503, processing circuitry 503 performs respective operations of the flow chart.

At block 1210, processing circuitry 503 may receive installation data relating to an antenna of a radio access network, RAN node, where the installation data may include physical installation data and/or identifier data. According to some embodiments, the installation data may be received from the RAN node. According to some other embodiments, the RAN node may be a first RAN node, and the installation data may be received from a user equipment (UE) device via a second RAN node.

The physical installation data may include at least one of a location of the antenna, a height of the antenna, a direction of the antenna, and/or a tilt of the antenna.

The identifier data may include an identification of a radio node that is associated with the antenna. According to some embodiments, the radio node and the antenna may be provided as an integrated antenna/radio node, and the identification of the radio node may thus be an identification of the integrated antenna/radio node. According to some other embodiments, the antenna may be coupled with the radio node via a cable and an antenna port of the radio node, and the identifier data may further include at least one of an identifier of the antenna and/or an identifier of the antenna port of the radio node.

According to some embodiments, the identifier data may include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node. The identifier data may include at least one of a bar code and/or a QR-code.

At block 1220, processing circuitry 503 may generate documentation of an installation of the RAN node based on the installation data responsive to receiving the installation data.

At block 1230, processing circuitry 503 may store the documentation of the installation of the RAN node in electronic memory.

Figure 12:
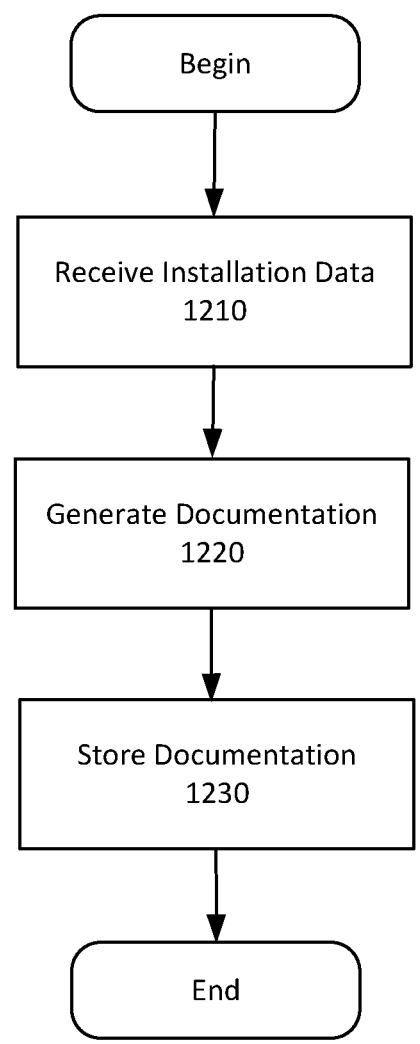
FIG. 12 is a flow chart illustrating operations of a management node according to some embodiments of inventive concepts.

Various operations from the flow chart of FIG. 12 may be optional with respect to some embodiments of management nodes and related methods.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network

1306, network nodes 1360 and 1360*b*, and WDs 1310, 1310*b*, and 1310*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and an RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
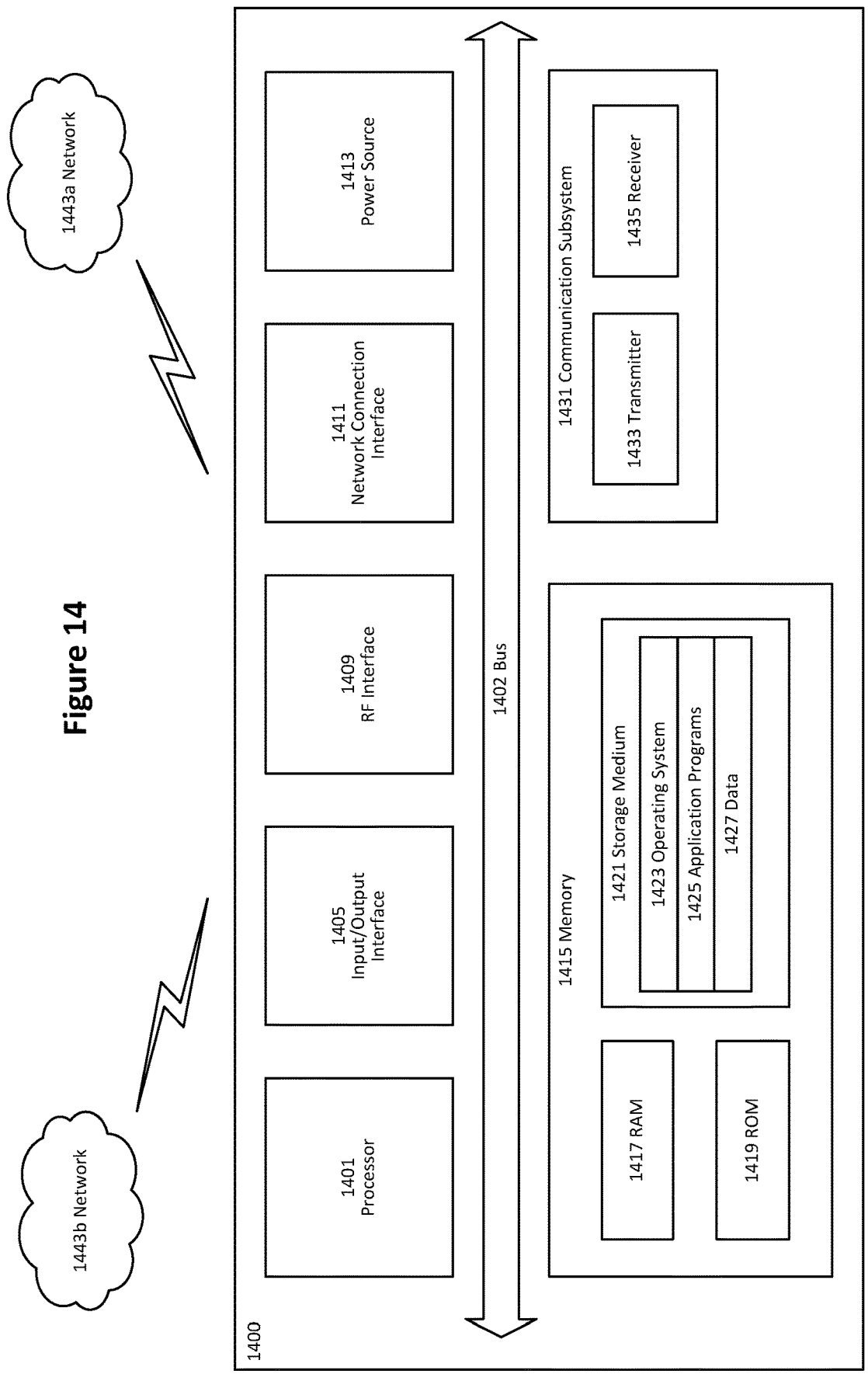
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the 3rd Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443*a*. Network 1443*a* may encompass wired and/or wireless networks such as a local-area network (LAN), a wide-area network (WAN), a computer network, a wireless network, a telecommunications network, another like network or any combination thereof. For example, network 1443*a* may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443*b* using communication subsystem 1431. Network 1443*a* and network 1443*b* may be the same network or networks or different network or networks. Communication subsystem 1431 may be configured to include one or more transceivers used to communicate with network 1443*b*. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GNSS/GPS) to determine a location, another like communication function, or any combination thereof. For example, communication subsystem 1431 may include cellular communication, Wi-Fi communication, Bluetooth communication, and GNSS/GPS communication. Network 1443*b* may encompass wired and/or wireless networks such as a local-area network (LAN), a wide-area network (WAN), a computer network, a wireless network, a telecommunications network, another like network or any combination thereof. For example, network 1443*b* may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
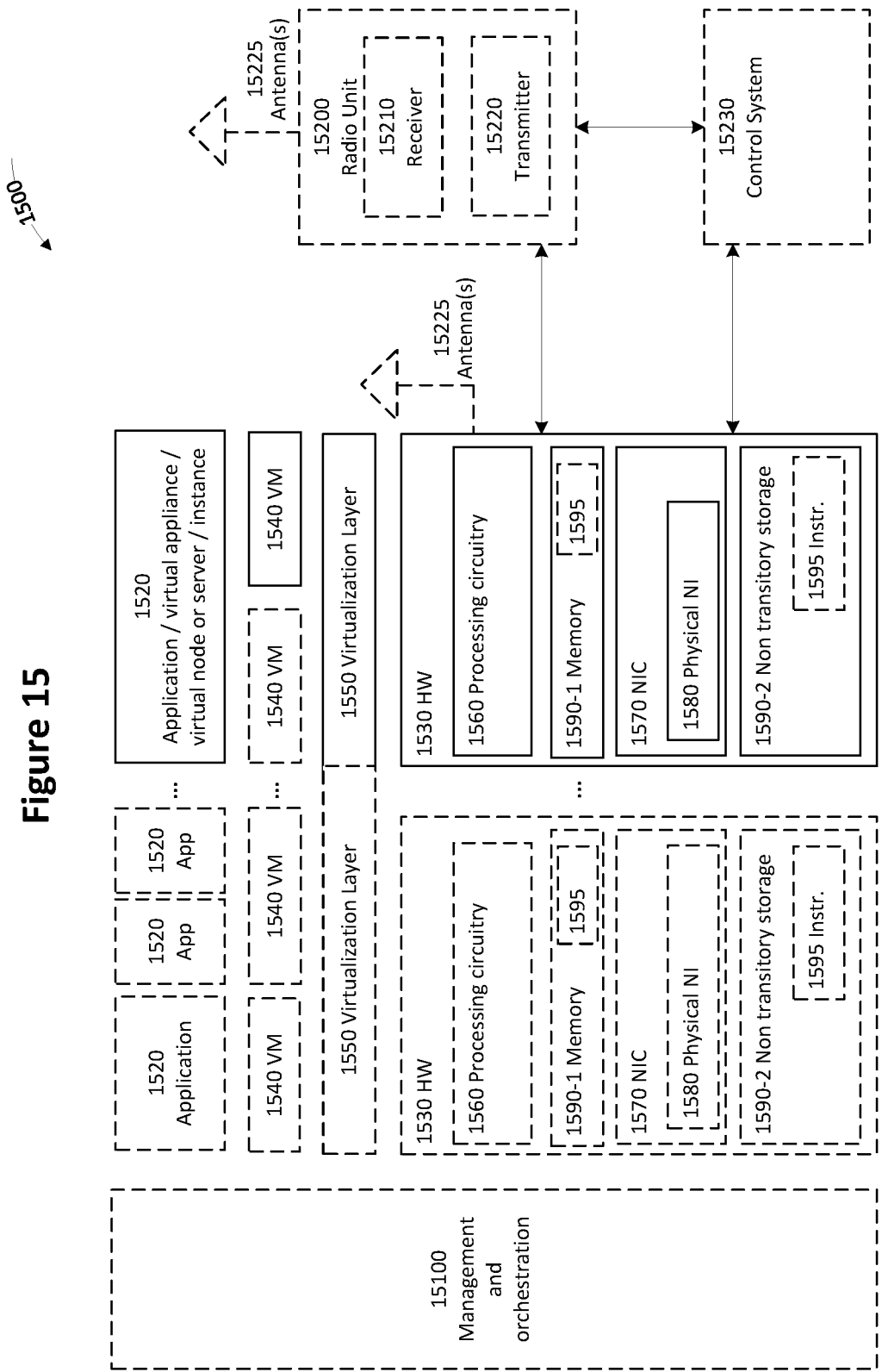
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be affected with the use of control system 15230 which may alternatively be used for communication between the hardware nodes 1530 and radio units 15200.

Figure 16:
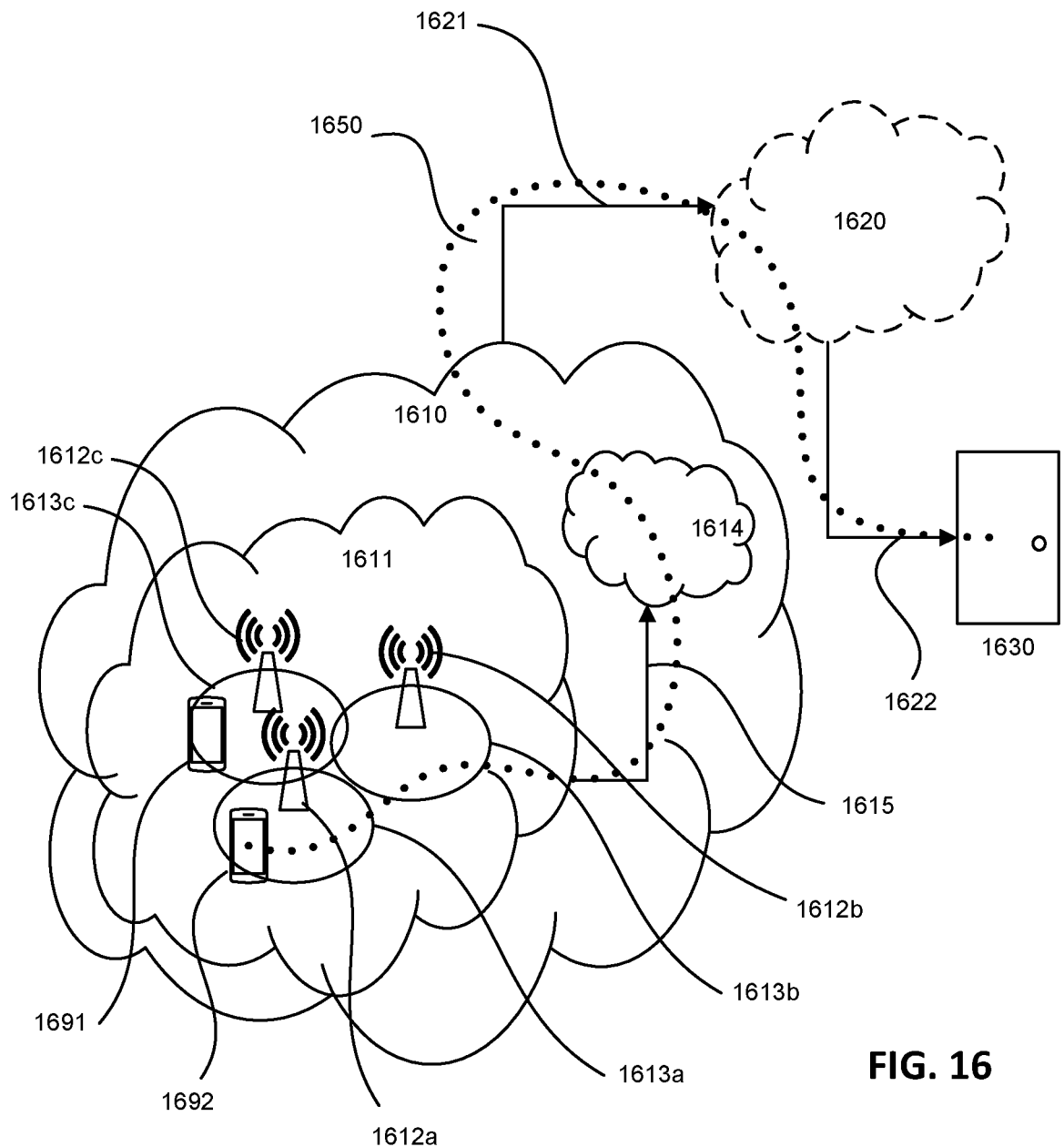
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
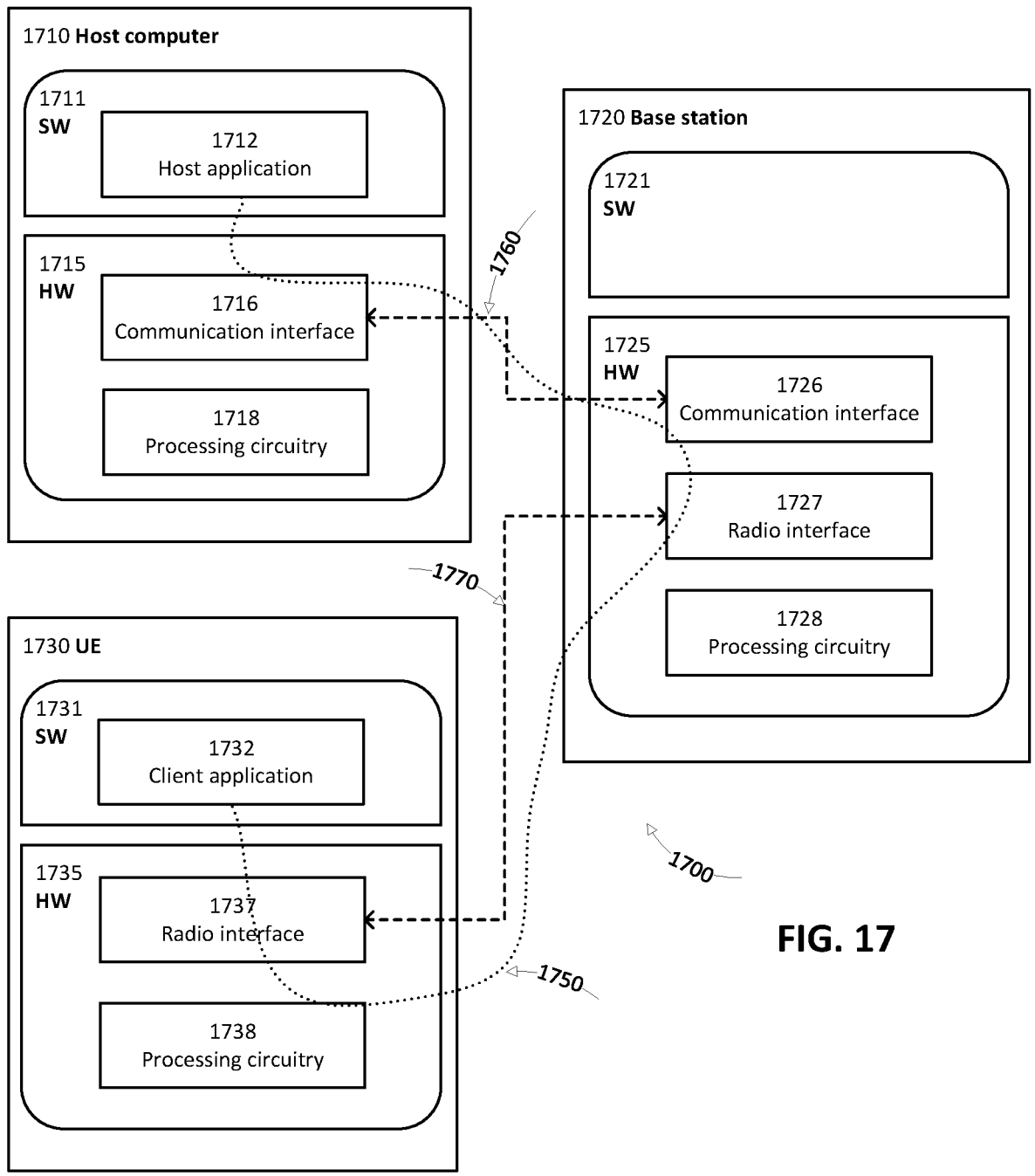
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments may improve the performance of OTT services provided to UE 1730 using OTT connection 1750, in which wireless connection 1770 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
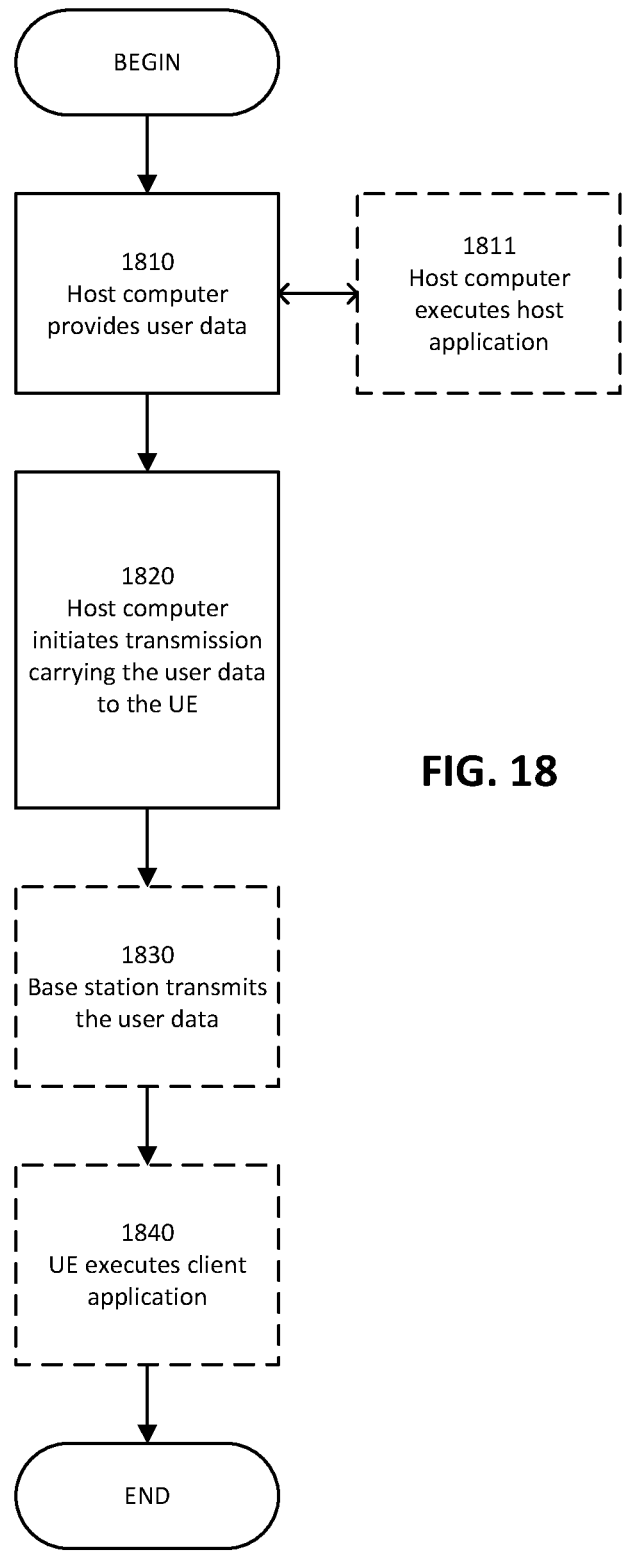
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
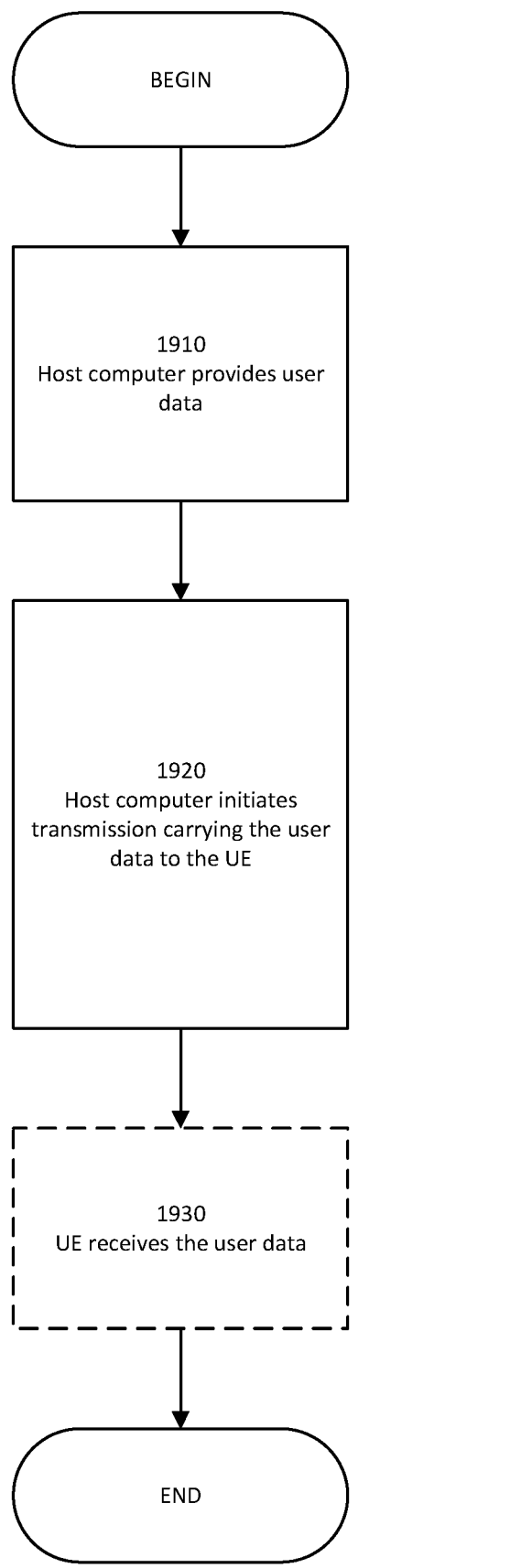
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
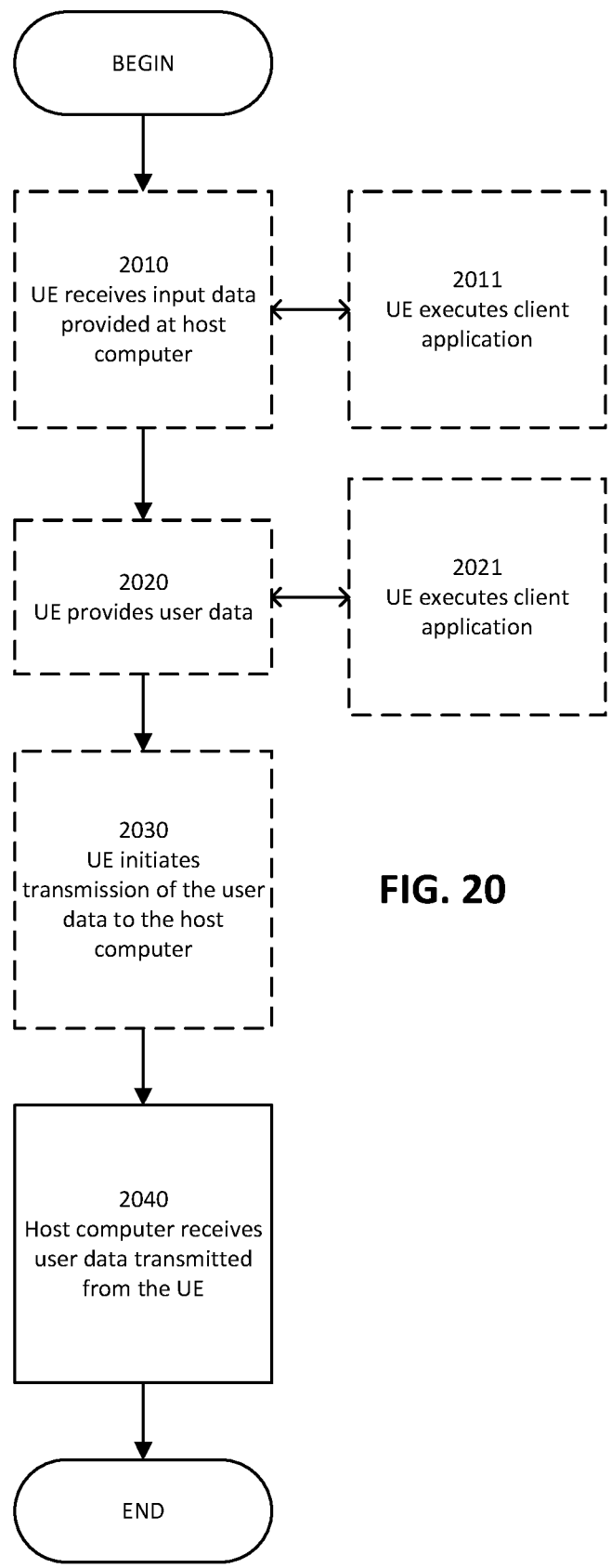
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
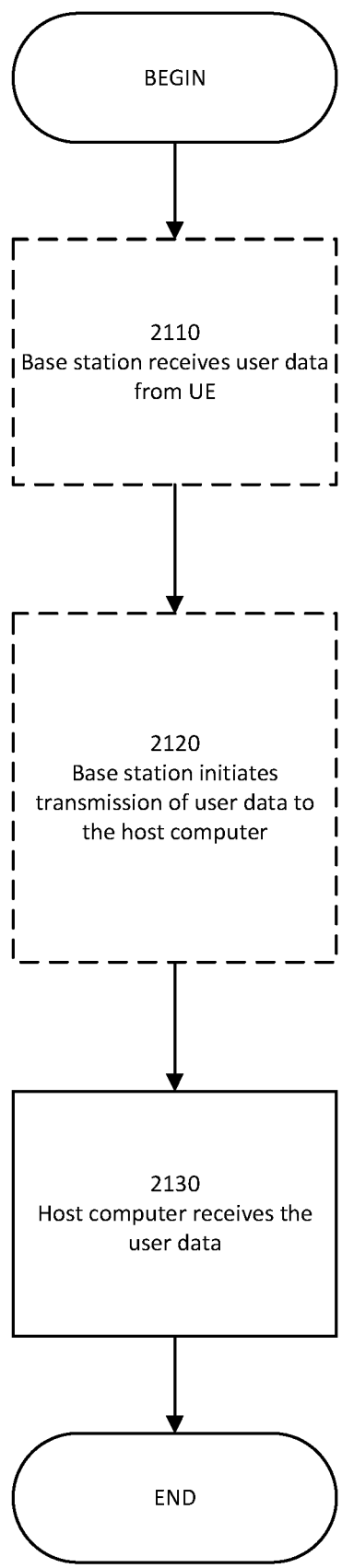
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method of operating a User Equipment (UE) device, the method comprising:
   providing a prompt through a user interface for a user of the UE device to position the UE device physically against an antenna of a radio access network (RAN) node;
   accepting user input indicating that the UE device is physically positioned against the antenna after providing the prompt;
   responsive to accepting the user input indicating that the UE device is physically against the antenna, obtaining installation data relating to the antenna of the RAN node, wherein the installation data comprises physical installation data including at least one of a height of the antenna, a direction of the antenna, and/or a tilt of the antenna; and
   transmitting the installation data from the UE device to a management system for a wireless communication network including the RAN node.

2. The method of claim 1, wherein obtaining the physical installation data comprises at least one of obtaining the height of the antenna using information from a Global Navigation Satellite System (GNSS) application running on the UE device, obtaining the direction of the antenna using a GNSS application and/or compass application running on the UE device, and/or obtaining the tilt of the antenna using a level application running on the UE device.

3. The method of claim 1, wherein the physical installation data further includes a location of the antenna.

4. The method of claim 3, wherein obtaining the physical installation data comprises obtaining the location of the antenna using information from a Global Navigation Satellite System (GNSS) application running on the UE device.

5. The method of claim 1 further comprising:
   after obtaining the physical installation data, providing an indication for the user that the physical installation data has been obtained.

6. The method of claim 1, wherein obtaining the installation data comprises obtaining identifier data including an identification of a radio node of the RAN node that is associated with the antenna of the RAN node.

7. The method of claim 6, wherein the radio node and the antenna comprise an integrated antenna/radio node, and wherein the identification of the radio node is an identification of the integrated antenna/radio node.

8. The method of claim 6, wherein the antenna is coupled with the radio node via a cable and an antenna port of the radio node, and wherein the identifier data further includes at least one of an identifier of the antenna and/or an identifier of the antenna port of the radio node.

9. The method of claim 6, wherein the identifier data further comprises at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node.

10. The method of claim 6, wherein the RAN node includes a transport node, wherein the identifier data further comprises at least one of an identifier of the transport node that is coupled with the radio node, an identifier of a radio port of the transport node that is coupled with the radio node, and/or an identifier of a transport port of the radio node that is coupled with the transport node.

11. The method of claim 6, wherein obtaining the identifier data comprises obtaining the identifier data via a short range wireless communication received from an element of the RAN node.

12. The method of claim 11, wherein the short range wireless communication received from the element of the RAN node comprises at least one of a WiFi communication, a BlueTooth Communication, and/or a Near Field Communication.

13. The method of claim 6, wherein obtaining the identifier data comprises obtaining at least one identifier as a radio frequency identifier (RFID).

14. The method of claim 6, wherein obtaining the identifier data comprises obtaining the identifier data optically using a camera of the UE device.

15. The method of claim 14, wherein obtaining the identifier data optically comprises accepting a digital image of at least one of a bar code and/or a QR-code from the camera.

16. The method of claim 14, wherein obtaining the identifier data optically comprises providing a prompt for a user of the UE device to take a picture of the identifier data using the camera, and obtaining the identifier data using data from the camera responsive to user input to capture an image.

17. The method of claim 1, wherein the RAN node is a first RAN node, and wherein transmitting the installation data comprises transmitting the installation data to the management system using a wireless mobile/cellular network communication via a second RAN node.

18. The method of claim 1, wherein transmitting the installation data comprises transmitting the installation data to the management system using a short range wireless communication via the RAN node.

19. The method of claim 18, wherein the short range wireless communication comprises at least one of a WiFi and/or BlueTooth Communication.

20. A User Equipment (UE) device comprising:
processing circuitry; and
memory coupled with the processing circuitry, wherein the memory includes instructions that when executed by the processing circuitry causes the UE device to perform operations comprising:
providing a prompt through a user interface for a user of the UE device to position the UE device physically against an antenna of a radio access network (RAN) node;
accepting user input indicating that the UE device is physically positioned against the antenna after providing the prompt;
responsive to accepting the user input indicating that the UE device is physically against the antenna, obtaining installation data relating to the antenna of the RAN node, wherein the installation data comprises physical installation data including at least one of a height of the antenna, a direction of the antenna, and/or a tilt of the antenna; and
transmitting the installation data from the UE device to a management system for a wireless communication network including the RAN node.

21. A computer program product comprising a non-transitory storage medium including program code to be executed by processing circuitry of a User Equipment (UE) device, whereby execution of the program code causes the UE device to perform operations comprising:
providing a prompt through a user interface for a user of the UE device to position the UE device physically against an antenna of a radio access network (RAN) node;
accepting user input indicating that the UE device is physically positioned against the antenna after providing the prompt;
responsive to accepting the user input indicating that the UE device is physically against the antenna, obtaining installation data relating to the antenna of the RAN node, wherein the installation data comprises physical installation data including at least one of a height of the antenna, a direction of the antenna, and/or a tilt of the antenna; and
transmitting the installation data from the UE device to a management system for a wireless communication network including the RAN node.

* * * * *